US009881703B2

(12) United States Patent
Liszkai et al.

(10) Patent No.: US 9,881,703 B2
(45) Date of Patent: Jan. 30, 2018

(54) SEISMIC ATTENUATION SYSTEM FOR A NUCLEAR REACTOR

(71) Applicant: NuScale Power, LLC, Corvallis, OR (US)

(72) Inventors: Tamas Liszkai, Corvallis, OR (US); Seth Cadell, Corvallis, OR (US)

(73) Assignee: NUSCALE POWER, LLC, Corvallis, OR (US)

( * ) Notice: Subject to any disclaimer, the term of this patent is extended or adjusted under 35 U.S.C. 154(b) by 371 days.

(21) Appl. No.: 14/528,123

(22) Filed: Oct. 30, 2014

(65) Prior Publication Data
US 2016/0125964 A1 May 5, 2016

Related U.S. Application Data

(60) Provisional application No. 61/922,541, filed on Dec. 31, 2013.

(51) Int. Cl.
*G21C 9/04* (2006.01)
*G21C 5/10* (2006.01)
(Continued)

(52) U.S. Cl.
CPC ............... *G21C 9/04* (2013.01); *G21C 5/10* (2013.01); *G21C 1/322* (2013.01); *G21C 13/024* (2013.01); *Y02E 30/40* (2013.01)

(58) Field of Classification Search
CPC ........... G21C 9/04; G21C 5/10; G21C 13/024
(Continued)

(56) References Cited

U.S. PATENT DOCUMENTS 3,009,867 A * 11/1961 Kinsey ................ G21C 15/12
376/293
3,599,589 A   8/1971 Busey
(Continued)

FOREIGN PATENT DOCUMENTS

DE    2642352    3/1978
DE    3221860    4/1986
(Continued)

OTHER PUBLICATIONS

International Preliminary Report on Patentability for PCT/US2014/063127; dated Jul. 14, 2016; 10 pages. for PCT/US2014/063127; dated Jul. 14, 2016; 10 pages.
(Continued)

*Primary Examiner* — Jack W Keith
*Assistant Examiner* — Daniel Wasil
(74) *Attorney, Agent, or Firm* — Schwabe Williamson & Wyatt

(57) ABSTRACT

A system for attenuating seismic forces includes a reactor pressure vessel containing nuclear fuel and a containment vessel that houses the reactor pressure vessel. Both the reactor pressure vessel and the containment vessel include a bottom head. Additionally, the system includes a base support to contact a support surface on which the containment vessel is positioned in a substantially vertical orientation. An attenuation device is located between the bottom head of the reactor pressure vessel and the bottom head of the containment vessel. Seismic forces that travel from the base support to the reactor pressure vessel via the containment vessel are attenuated by the attenuation device in a direction that is substantially lateral to the vertical orientation of the containment vessel.

10 Claims, 19 Drawing Sheets

(51) Int. Cl.
*G21C 13/024* (2006.01)
*G21C 1/32* (2006.01)

(58) Field of Classification Search
USPC ............... 376/277, 285, 293, 294, 302, 461
See application file for complete search history.

(56) References Cited

U.S. PATENT DOCUMENTS

| | | | |
|---|---|---|---|
| 3,865,688 A | | 2/1975 | Kleimola |
| 4,008,757 A | * | 2/1977 | Weatherford ............. F28F 9/00 376/285 |
| 4,064,005 A | | 12/1977 | Baujat |
| 4,081,323 A | | 3/1978 | Gans |
| 4,179,104 A | | 12/1979 | Skinner |
| 4,258,937 A | | 3/1981 | Barneoud |
| 4,295,620 A | * | 10/1981 | LeClou .................. G21C 13/02 376/461 |
| 4,581,199 A | | 4/1986 | Bioret |
| 4,755,349 A | | 7/1988 | Canini |
| 5,024,804 A | | 6/1991 | Blaushild |
| 5,087,408 A | | 2/1992 | Tominaga |
| 5,152,253 A | | 10/1992 | Jenko |
| 5,217,681 A | * | 6/1993 | Wedellsborg .......... G21C 13/10 376/461 |
| 5,276,720 A | | 1/1994 | Oosterkamp |
| 5,434,894 A | | 7/1995 | Chiang |
| 5,600,689 A | | 2/1997 | Weems |
| 5,740,216 A | | 4/1998 | Morishita |
| 6,160,864 A | | 12/2000 | Gou |
| 6,356,614 B1 | | 3/2002 | Allen |
| 6,795,518 B1 | | 9/2004 | Conway |
| 8,424,253 B2 | | 4/2013 | Loewen et al. |
| 9,251,919 B2 | | 2/2016 | Iwaki et al. |
| 2010/0124304 A1 | * | 5/2010 | Nylander ............. G21C 13/024 376/293 |
| 2014/0366354 A1 | * | 12/2014 | Snuggerud ............. G21C 17/10 29/822 |
| 2015/0357054 A1 | * | 12/2015 | Edwards .................. G21C 5/10 376/302 |
| 2015/0364222 A1 | * | 12/2015 | Inman .................. G21C 13/024 376/302 |

FOREIGN PATENT DOCUMENTS

| | | |
|---|---|---|
| GB | 1510753 | 5/1978 |
| JP | 51137089 | 11/1976 |
| JP | 62187289 | 3/1978 |
| JP | 58099793 | 6/1983 |
| JP | 04053598 | 5/1992 |
| JP | 11153184 | 6/1999 |
| JP | 11351325 | 12/1999 |
| JP | 2000055119 | 2/2000 |
| JP | 2001073391 | 3/2001 |
| JP | 2001188095 | 7/2001 |
| JP | 2001323686 | 11/2001 |
| JP | 2006125183 | 5/2006 |
| WO | WO2009064654 | 10/2009 |

OTHER PUBLICATIONS

International Search Report and Written Opinion for PCT/US2009/063127; dated Mar. 10, 2015; 13 pages.
Modro, S.M., et al.; "Multi-Application Small Light Water Reactor Final Report;" Idaho national Engineering and Environmental Laboratory; INEEL/EXT-04-01626; Dec. 2003; Idaho Falls, ID, U.S.A.
Communication Pursuant to Article 34(3) EPC; Manini, Adriano; May 2, 2012; European Patent Office (EPO); 09760394.8-2208; 5 pages.
Reyes, et al.; "Testing of the multi-application small light water reactor (MASLWR) passive safety systems" Nuclear Engineering and Design, Amsterdam, NL, vol. 237 No. 18, Aug. 25, 2007.
IAEA; IAEA Tecdoc 1391—Status of Advanced Light Water Reactor Designs 2004; May 2004; pp. 279-306, 489-512; Nuclear Power Technology Development Section, International Atomic Energy Agency' Vienna; Austria.
IAEA; IAEA Tecdoc 1485—Status of Innovative Small and Medium Sized Reactor Designs 2005; Mar. 2006; pp. 93-162; Nuclear Power Technology Development Section, International Atomic Energy Agency; Vienna; Austria.
Reyes, Jose N. "Nuscale Power Introduction to NuScale Design", Jul. 24, 2008, http://ww.nuscalepower.com/pdf/NRCJ>reapp_mtg_072.
International Search Report and Written Opinion for PCT/US2009/064849; dated Mar. 8, 2010; 13 pages.
Korean Intellectual Property Office, Notice of Non-final Rejection dated Jun. 28, 2013 for Application No. 10/2011-7013844, 7 pages.
Canadian Intellectual Property Office, Examination Report dated May 31, 2013 for Application No. 2,745,581, 4 pages.
State Intellectual Property Office of the People's Republic of China, First Office Action dated Aug. 20, 2013 for Application No. 200980153545.3, 25 pages.
"Patent Document Bulletin—Atomic Energy", edited by CIAE, vol. 5, Dec. 31, 1989, p. 164.
Korean Intellectual Property Office, Notice of final Rejection dated Dec. 23, 2013 for Application No. 10-2011-7013844, 6 pages.
Japan Patent Office; Notices of Reasons for Rejection dated Feb. 12, 2014 for application No. 20114-536607, including English translation thereof (3 pages), 3 pages.
Korean intellectual Property Office, Notice of Second Final Rejection dated Feb. 27, 2014 for application No. 10-2011-7013844, including English translation thereof (3 pages), 3 pages.
State Intellectual Property office of the People's Republic of China, Second Office Action dated Apr. 25, 2014 for Application No. 200980153545.3, including English translation thereof (8 pages), 5 pages.
European Patent Office, Communication pursuant to Rule 71(3), EPC, intention to Grant dated Apr. 24, 2014 for Application 09760394.8; 7 pages.
Listing of Related Applications; May 17, 2016.

\* cited by examiner

SEISMIC ATTENUATION SYSTEM FOR A NUCLEAR REACTOR

GOVERNMENT INTEREST

This invention was made with Government support under Contract No. DE-NE0000633 awarded by the Department of Energy. The Government has certain rights in this invention.

STATEMENT OF RELATED MATTERS

This application claims priority to U.S. Provisional Application No. 61/922,541 entitled MANAGING DYNAMIC FORCES ON A NUCLEAR REACTOR SYSTEM and filed on Dec. 31, 2013, which is herein incorporated by reference in its entirety.

TECHNICAL FIELD

This disclosure generally relates to systems, devices and methods for attenuating dynamic forces and/or seismic forces on a nuclear reactor system or other structure.

BACKGROUND

Seismic isolation may be utilized to control or reduce the response of a component or structure to vertical and horizontal ground-input motions or accelerations. Seismic isolation may accomplish this by decoupling the motion of the component/structure from the driving motion of the substructure. In some instances, hardware (e.g., springs) may be positioned between the substructure and superstructure. Use of such hardware may minimize the dynamic response of the structure by increasing the fundamental period of vibration for the component or structure, resulting in lower in-structure accelerations and forces. To further reduce spectral response amplitudes (e.g., deflections, forces, etc.), other mechanisms may be employed that effectively reduce the peak amplitude to manageable levels.

Piping and other connections may be provided between a nuclear reactor and a secondary cooling system or other systems in the power generation facility. In the event of an earthquake or other seismic activity, significant forces or vibration may be transferred to, or by, the connections, which can place great stress on the connections. Forces resulting from thermal expansion also place stress on the connections. Maintaining integrity of these connections helps discourage the inadvertent release of radioactive or other materials from the various systems, and reduces maintenance or damage that might otherwise occur if one or more of the connections fail.

During a seismic event, dynamic and/or seismic forces may be transmitted from the ground, support surface, or surrounding containment building to a reactor module. The seismic forces which are transferred to the reactor module may experience a cumulative increase and/or amplification in amplitude and/or frequency depending on the number and/or length of intervening structures and/or systems that the seismic forces travel in reaching the reactor module. If the seismic forces become large enough, the reactor core and/or fuel elements may be damaged.

The present invention addresses these and other problems.

DETAILED DESCRIPTION

Figure 1A:
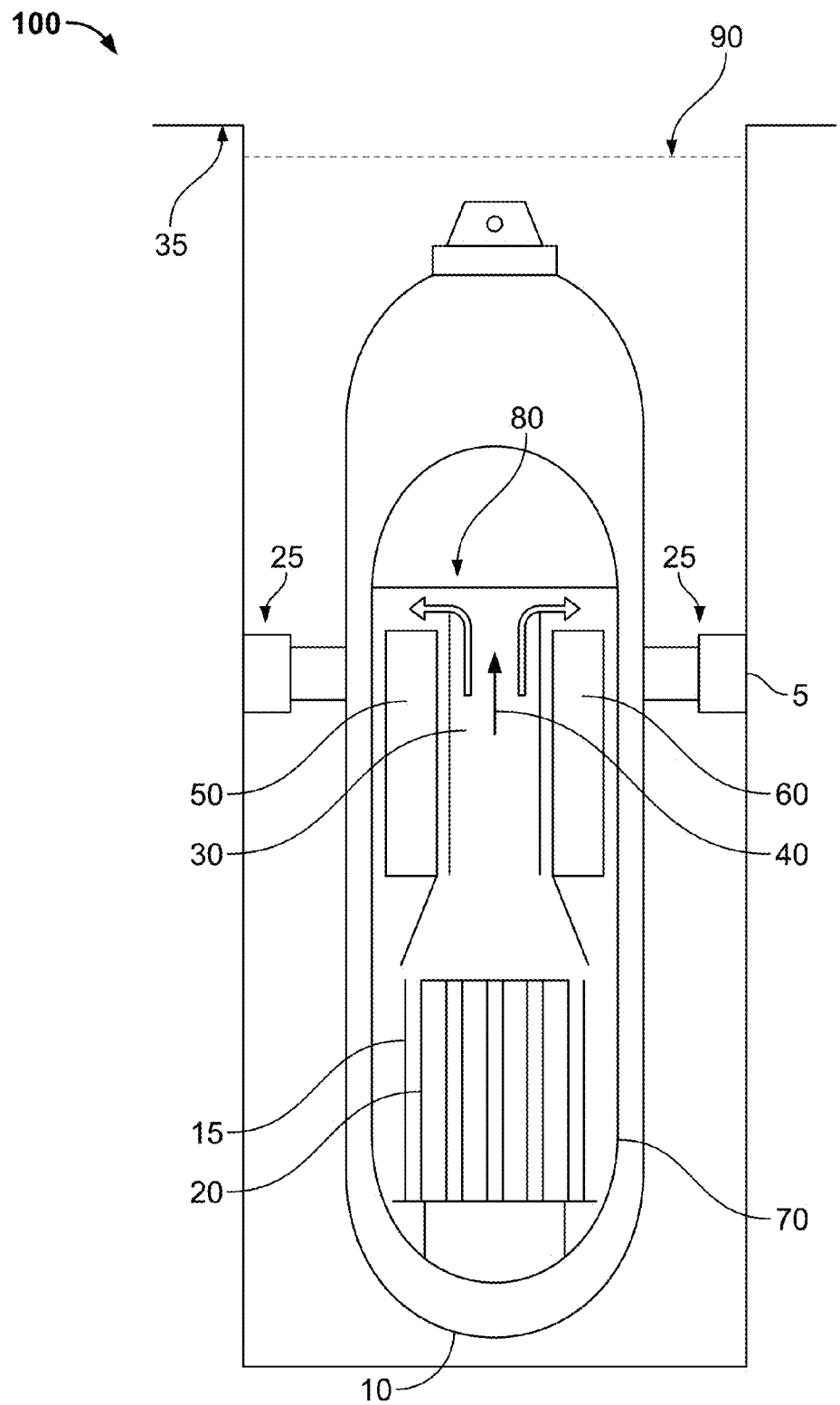
FIGS. 1A-1B provide a side view and top view, respectively, of a block diagram illustrating an example nuclear reactor system that includes one or more seismic isolation assemblies.

FIG. 1 is a block diagram illustrating a nuclear reactor system 100 (e.g., a nuclear reactor) that includes one or more seismic isolation assemblies 25. In some aspects, the nuclear reactor system 100 is a commercial power pressurized water reactor that utilizes natural circulation of a primary coolant to cool a nuclear core and transfer heat from the core to a secondary coolant through one or more heat exchangers. The secondary coolant (e.g., water), once heated (e.g., to steam, superheated steam or otherwise), can drive power generation equipment, such as steam turbines or otherwise, before being condensed and returned to the one or more heat exchangers.

With respect to the nuclear reactor system 100, a reactor core 20 is positioned at a bottom portion of a cylinder-shaped or capsule-shaped reactor vessel 70. Reactor core 20 includes a quantity of nuclear fuel assemblies, or rods (e.g., fissile material that produces, in combination with control rods, a controlled nuclear reaction), and optionally one or more control rods (not shown). As noted above, in some implementations, nuclear reactor system 100 is designed with passive operating systems (e.g., without a circulation pump for the primary coolant) employing the laws of physics to ensure that safe operation of the nuclear reactor 100 is maintained during normal operation or even in an emergency condition without operator intervention or supervision, at least for some predefined period of time.

A cylinder-shaped or capsule-shaped containment vessel 10 surrounds reactor vessel 70 and may be partially or completely submerged in a reactor pool, such as below waterline 90 (which may be at or just below a top surface 35 of the bay 5), within reactor bay 5. The volume between reactor vessel 70 and containment vessel 10 may be partially or completely evacuated to reduce heat transfer from reactor vessel 70 to the reactor pool. However, in other implementations, the volume between reactor vessel 70 and containment vessel 10 may be at least partially filled with a gas and/or a liquid that increases heat transfer between the reactor and containment vessels.

In the illustrated implementation, reactor core 20 is submerged within a liquid, such as water, which may include boron or other additives, which rises into channel 30 after making contact with a surface of the reactor core. The upward motion of heated coolant is represented by arrows 40 (e.g., primary coolant 40) within channel 30 (e.g., riser 30). The coolant travels over the top of heat exchangers 50 and 60 and is drawn downward by density difference along the inner walls of reactor vessel 70 thus allowing the coolant to impart heat to heat exchangers 50 and 60. After reaching a bottom portion of the reactor vessel 70, contact with reactor core 20 results in heating the coolant, which again rises through channel 30. Although heat exchangers 50 and 60 are shown as two distinct elements in FIG. 1, heat exchangers 50 and 60 may represent any number of helical (or other shape) coils that wrap around at least a portion of channel 30.

Normal operation of the nuclear reactor module proceeds in a manner wherein heated coolant rises through channel 30 and makes contact with heat exchangers 50 and 60. After contacting heat exchangers 50 and 60, the coolant sinks towards the bottom of reactor vessel 70 in a manner that coolant within reactor vessel 70 remains at a pressure above atmospheric pressure, thus allowing the coolant to maintain a high temperature without vaporizing (e.g., boiling).

As coolant within heat exchangers 50 and 60 increases in temperature, the coolant may begin to boil. As the coolant within heat exchangers 50 and 60 begins to boil, vaporized coolant, such as steam, may be used to drive one or more turbines that convert the thermal potential energy of steam into electrical energy. After condensing, coolant is returned to locations near the base of heat exchangers 50 and 60.

In the illustrated implementation, a downcomer region between the reflector 15 and the reactor vessel 70 provides a fluid path for the primary coolant 40 flowing in an annulus between the riser 30 and the reactor vessel 70 from a top end of the vessel 70 (e.g., after passing over the heat exchangers 50, 60) and a bottom end of the vessel 70 (e.g., below the core 20). The fluid path channels primary coolant 40 that has yet to be recirculated through the core 20 into convective contact with at least one surface of the reflector 15 in order to cool the reflector 15.

Figure 1B:
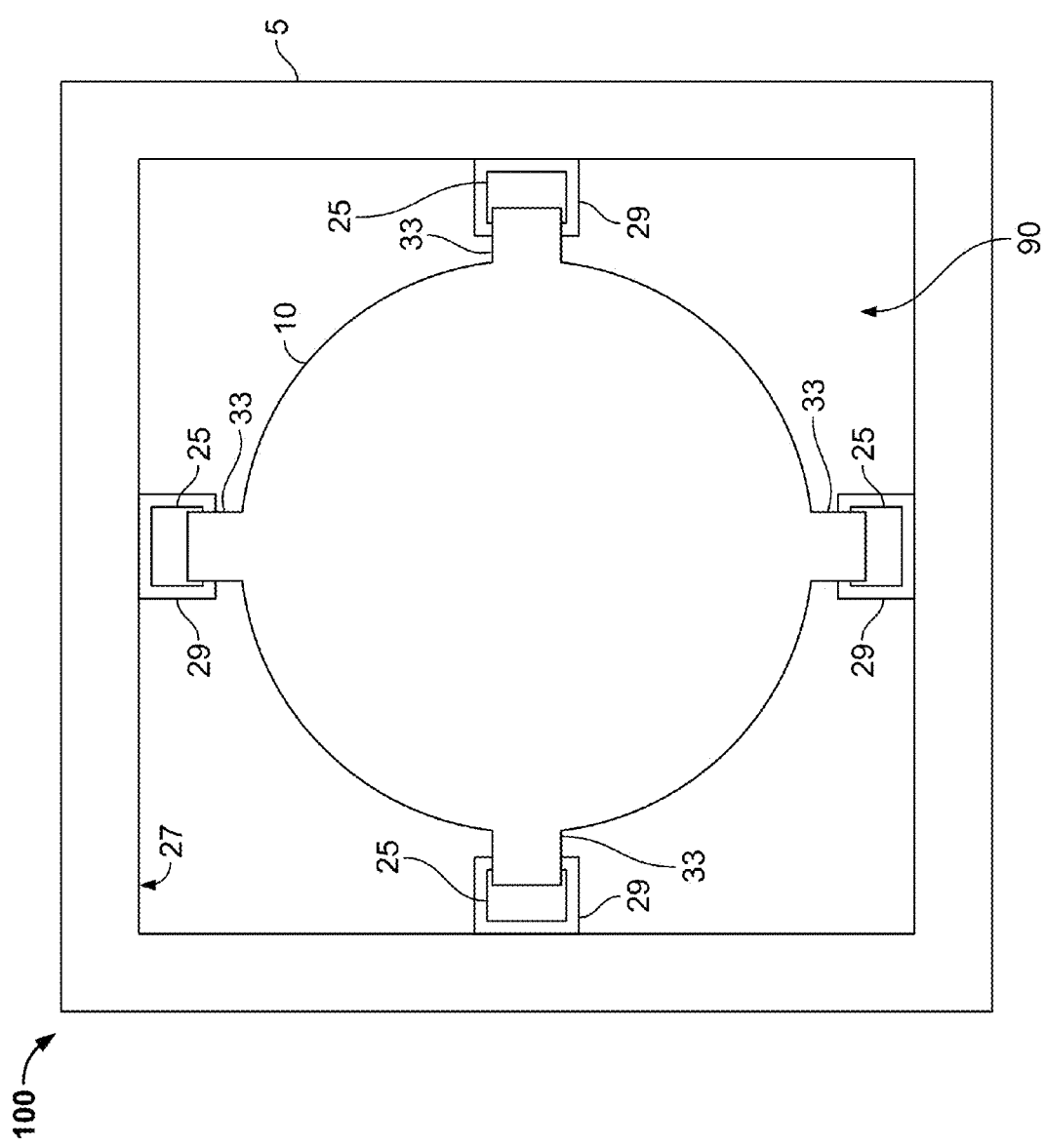

As illustrated, the containment vessel 10 may be coupled to the reactor bay 10 through one or more seismic isolation assemblies 25. As shown in FIG. 1B, each seismic isolation assembly 25 may be mounted in or on an embedment 29 that extends from an interior surface 27 of the reactor bay 5. Although four seismic isolation assemblies 25 are shown in FIG. 1B (one per wall of the interior surface 27 of the bay 5), there may be more or fewer seismic isolation assemblies 25 to support the containment vessel 10, as necessary. The containment vessel 10, in this implementation, includes support lugs 33 that rest on the embedments 29 adjacent the seismic isolation assemblies 25.

In some implementations, the seismic isolation assemblies 25, embedments 29, and support lugs 33 may be positioned at or near an axis through the containment vessel 10 that intersects an approximate center of gravity (CG), or slightly above the CG, of the vessel 10. The containment vessel 10 (and components therein) may be supported by the seismic isolation assemblies 25, embedments 29, and support lugs 33 in combination with a buoyancy force of the pool of liquid 90 acting on the containment vessel 10.

Generally, the illustrated seismic isolation assemblies 25 (shown in more detail in FIGS. 2A-2B and 3A-3B) may include one or more components that experience plastic deformation in response to a seismic event (or other motion-causing event) that results in a force on the containment vessel 10. For example, in the case of a seismic event, seismic energy may be dissipated through one or more portions of the assemblies 25 (e.g., a series of conical, or other shapes bounded by convex surfaces, elements) by penetrating and contracting such portions to plastically deform the one or more portions of assemblies 25. Energy may be absorbed by plastic deformation and friction between moving elements of the assemblies 25.

In some implementations, stiffness of the assembly 25 may be controlled by sizing the plastically deformable elements. For example, a multiple of cones, dies, and cylinders (as the plastically deformable elements) can be arranged in an enclosure as shown in more detail in FIGS. 3A-3B. The enclosure of the assembly 25 may move relative to the support lugs 29 (or other reactor bay embedment). In the case of a seismic event such as an earthquake, the seismic isolation assemblies 25 may contribute to a safe shut down of the nuclear reactor system 100, while maintaining coolable geometry. In some implementations, the seismic isolation assemblies 25 may be sized for a sliding force above forces associated with an operating basis earthquake (OBE). An OBE may be typically one third to one half of forces associated with a safe shutdown earthquake (SSE). The SSE event is classified as a faulted condition, service Level D. The OBE event is classified as an Upset condition, service Level B.

When the reactor system 100 is subject to an earthquake below the intensity of an OBE, operations may resume shortly after the event without any major repairs or inspections. As a result, during an OBE, the seismic isolation assemblies 25 may not undergo any plastic deformation. For instance, if the seismic isolation assemblies 25 may remain linear (e.g., experience no or negligible plastic deformation) during an OBE, replacement of the isolation assemblies 25 may not be necessary. When the reactor system 100 is subject to an SSE, the isolation assemblies 25 may be plastically exercised and may be removed and/or replaced. Replacement of the seismic isolation assemblies 25, may be much less costly, however, than replacement of other components (e.g., of the reactor system 100).

Figure 2A:
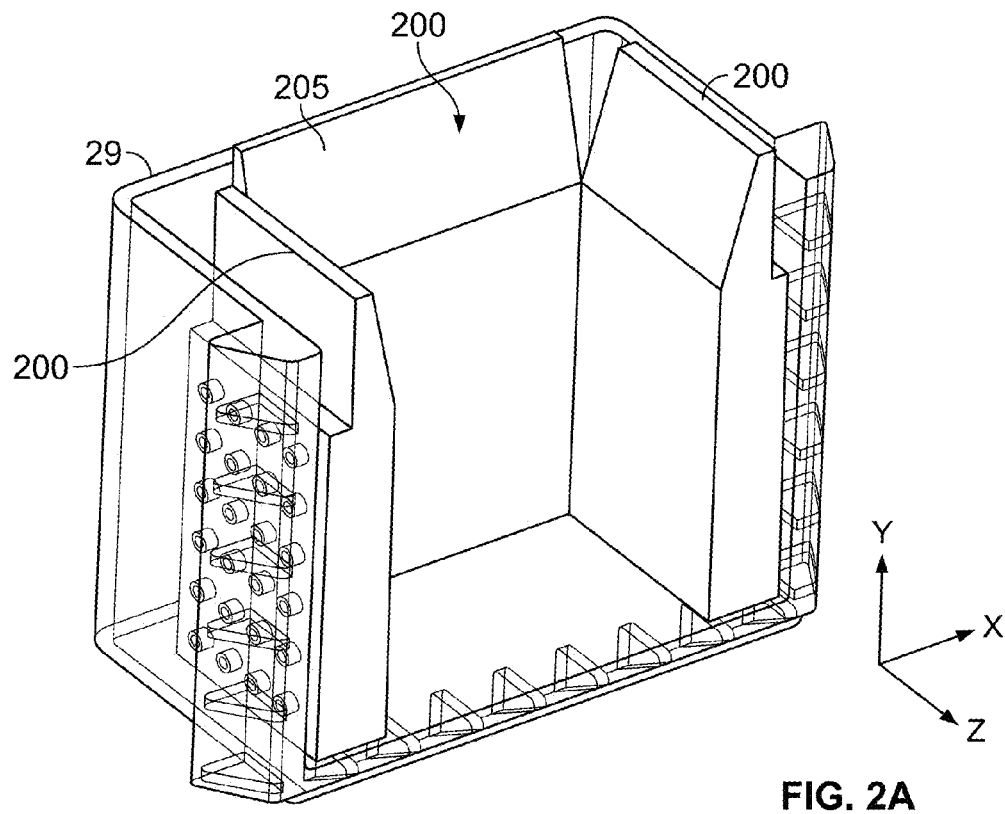
FIGS. 2A-2B illustrate an example implementation of a seismic isolation assembly.
Figure 2B:
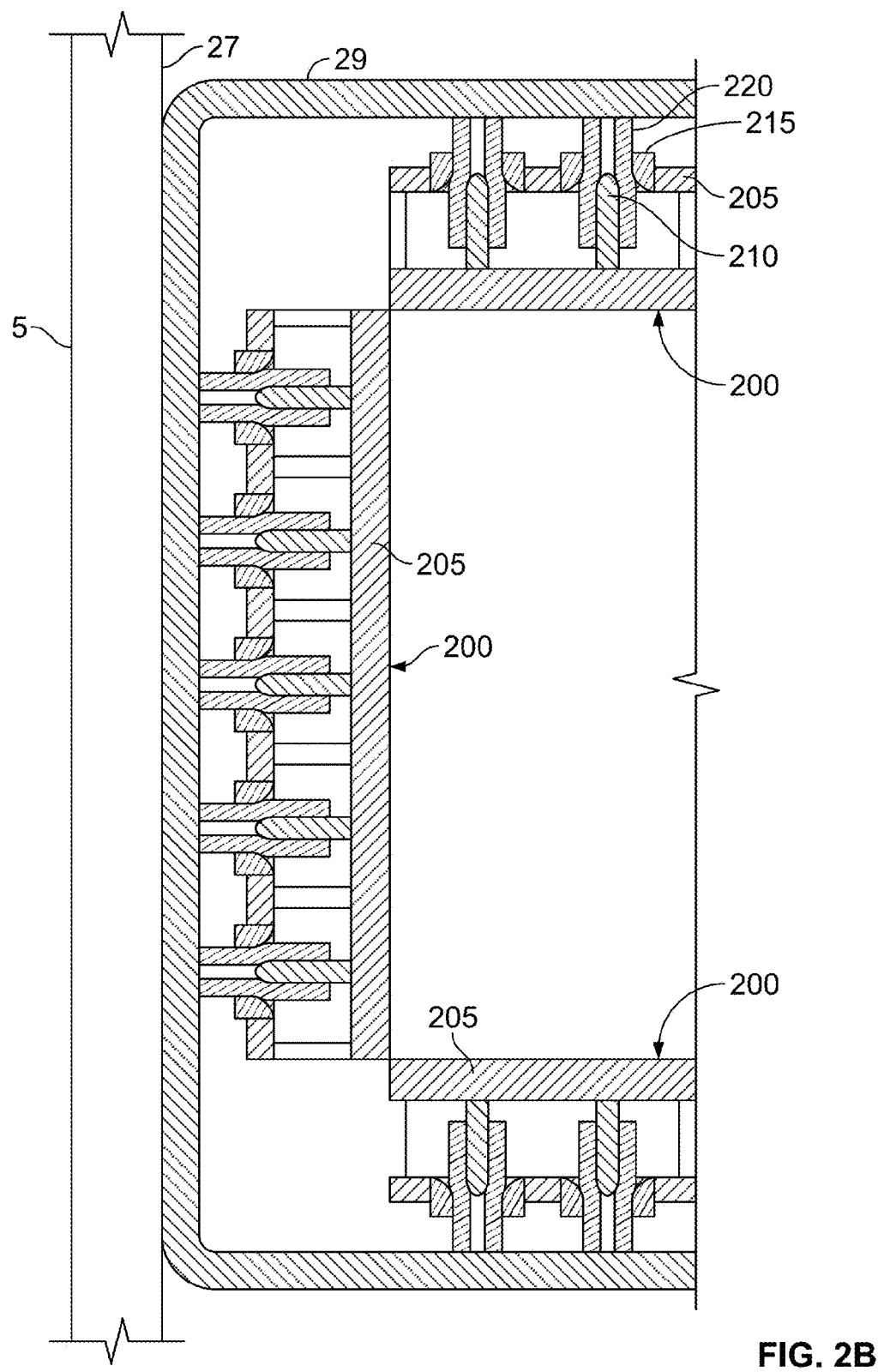

FIGS. 2A-2B illustrate an example implementation of a seismic isolation assembly 200. In some aspects, the seismic isolation assembly 200 may be used as the seismic isolation assembly 25 shown in FIGS. 1A-1B. FIG. 2A shows an isometric view of several seismic isolation assemblies 200 mounted in an embedment 29, while FIG. 2B shows a top view of the seism isolation assemblies 200 mounted in the embedment 29, with several internal components exposed for detail.

As shown in FIG. 2A, several (e.g., three) seismic isolation assemblies 200 may be mounted against vertical surfaces of the embedment 29, thereby defining a pocket (e.g., for receiving a support lug of the containment vessel 10). Each seismic isolation assembly 200 may affixed to one of the vertical surfaces or may simply rest in the embedment 29 in contact with the vertical surface. In this example implementation, an enclosure 205 of the seismic isolation assembly 200 includes a rectangular cuboid portion that has a tapered, or ramped, top portion. Other shapes are contemplated by the present disclosure however. In some aspects, one or more plastically deformable elements may be mounted and/or contained, at least partially, within the cuboid portion 201.

FIG. 2B illustrates one or more internal components of each seismic isolation assembly 200. As shown, each seismic isolation assembly 200 may include a conical stretching element 210, a contracting die 215, and a cylindrical plasticity element 220. In some aspects, as illustrated in FIG. 2B, there may be several (e.g., between two and five) sets of the conical stretching element 210, contracting die 215, and cylindrical plasticity element 220. Other numbers of sets are also contemplated by the present disclosure and may depend, at least in part, on a size (e.g., dimension in the x or z direction shown in FIG. 2A) of the particular seismic isolation assembly 200.

In the illustrated implementation, a portion of the cylindrical plasticity element 220 may extend from the enclosure 205 and attach (e.g., rigidly or semi-rigidly, for example, by welding) to the embedment 29 (and by extension to the reactor bay 5). Thus, in some aspects, dynamic forces (e.g., seismic forces) that transmit through the reactor bay 5 may be borne by the seismic isolation assembly 200, through the cylindrical plasticity element 220.

In some aspects, an overall stiffness of each seismic isolation assembly 200 may be based, at least in part on the number of sets of the conical stretching element 210, contracting die 215, and cylindrical plasticity element 220, as well as the relative size of one or more of the conical stretching element 210, contracting die 215, and cylindrical plasticity element 220 within the enclosure 205. For example, turning briefly to FIG. 4, an example idealized representation 400 of the example implementation of the seismic isolation assembly 200.

Figure 4:
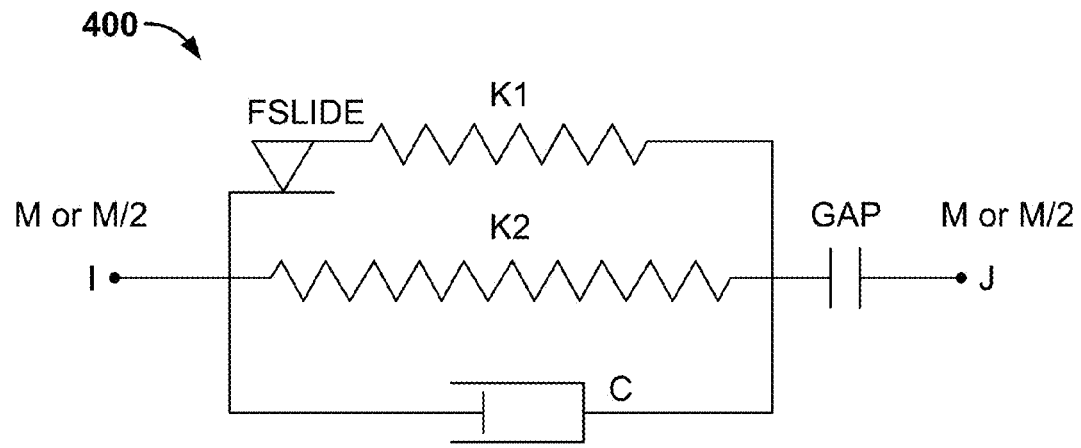
FIG. 4 illustrates an example implementation of a seismic isolation assembly.

As shown in FIG. 4, a spring-slider and damper are positioned in parallel. Representation 400 includes an "I" node that represents a reactor building wall embedment (e.g., the embedment 29) and a "J" node that represents the enclosure 205 of the seismic isolation assembly 200. The stiffness of the plasticity elements (e.g., the conical stretching element 210, contracting die 215, and cylindrical plasticity element 220) is represented by K1 (shown as a resistance element).

In some aspects, other "resistant" elements may also be accounted for, as shown in FIG. 4. For example, a hydraulic damping feature is represented by the damping coefficient, C. Additional stiffness elements (e.g., springs, Belleville washers, or otherwise) may also be used in the nuclear reactor system 100 (e.g., mounted within the enclosures 205 or mounted between the enclosures 205 and the embedments 29) to dissipate seismic forces (e.g., in parallel with the seismic isolation assembly 200) and are generally represented by K2.

A gap is also shown that represents a space (e.g., filled with a gas or fluid) between the seismic isolation assembly 200 and the embedment 29 (e.g., between nodes J and I). The FSLIDE value, as shown, represents an absolute value of a spring force that must be exceeded before sliding occurs. This sliding force may result from plastic deformation (e.g., of one or more of the conical stretching element 210, contracting die 215, and cylindrical plasticity element 220) and friction forces.

In some aspects, K1 may be chosen, and in some cases chosen in parallel with K2 and/or C, to attain a particular FSLIDE. The particular FSLIDE may be large enough so that seismic forces acting at node I from an event (e.g., an OBE or SSE event, or other event) do not exceed FSLIDE and, therefore, are completely or mostly borne by the elastic deformation that occurs in K1 (as well as, in some examples, spring and dampening of K2 and C, respectively).

Figure 5:
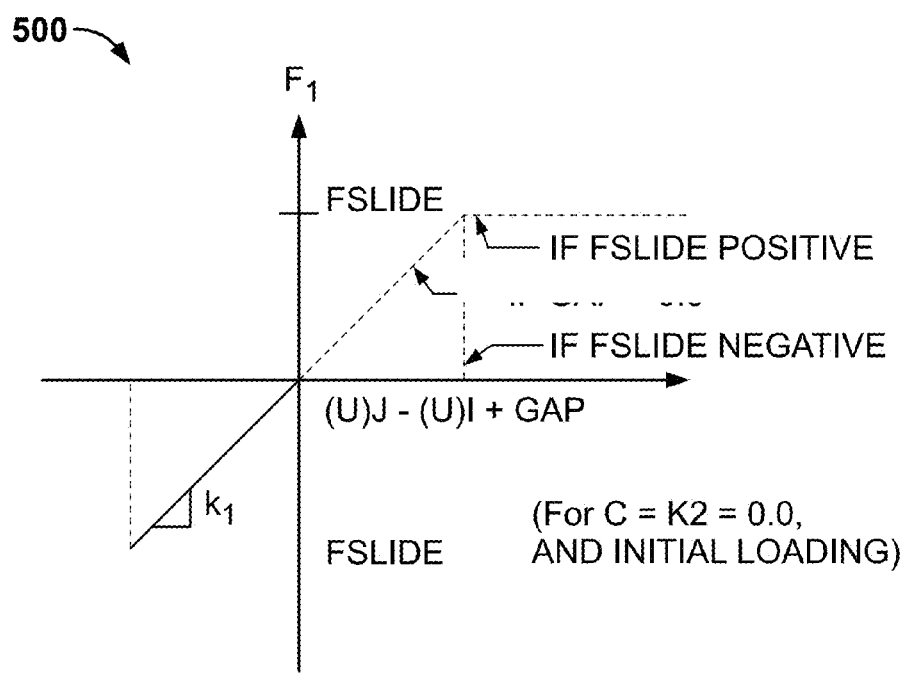
FIG. 5 illustrates a force-deflection diagram for an example implementation of a seismic isolation assembly.

Turning briefly to FIG. 5, a force-deflection diagram 500 illustrates the relationship (without effects of K2 and C) between seismic force on the seismic isolation assembly 200 and deflection. As illustrated, below the FSLIDE force, the system is linear (assuming that there is no gap between the seismic isolation assembly 200 and the embedment 29). When sliding occurs, the absorbed energy is proportional to the sliding force times the sliding distance.

In this illustration, the K1 and K2 springs are shown as linear (proportional) springs, but it can be generalized to any type of non-linear (inelastic, non-proportional) spring. For example, in other representations, the number of spring-damper-slider elements can be in any number and combination.

Returning to FIG. 2A, the illustrated seismic isolation assemblies 200 are attached to the embedment 29 through the cylindrical plasticity elements 220. As illustrated, there may be multiple sets of the conical stretching element 210, contracting die 215, and cylindrical plasticity element 220 arranged vertically within the enclosures 205. Contact between the embedment 29 and the cylindrical plasticity elements 220 may drive the relative movement of the enclosures 205 with respect to the bay 5 (and thus any structure that contains and is in contact with the bay 5).

The number of plasticity mechanisms inside each enclosure 205 (e.g., sets of the conical stretching element 210, contracting die 215, and cylindrical plasticity element 220) may be a function of an amount of dissipative energy needed to achieve adequate damping of the structure (e.g., the bay 5 or other structure) during a seismic event. The size of the enclosure 205 may be determined by an allowable relative displacement of the nuclear reactor system 100 with respect to the structure (e.g., about 4 inches as a maximum allowable displacement). The size of each isolation assembly 200 can be rather compact.

In some aspects, the conical stretching elements 210 and the cylindrical plasticity elements 220 may work together to dissipate forces in the X and Z directions as shown in FIG. 2A. For example, the conical stretching elements 210 may dissipate energy by plastically deforming the cylindrical plasticity elements 220 (e.g., by moving into the elements 210 toward the embedment 29) in response to forces in the X and Z directions. In some aspects, the contracting dies 215 may move with the movement of the conical stretching elements 210. In other aspects, the contracting dies 215 may simply be bores in the enclosures 205 through which the cylindrical plasticity elements 220 extend to contact the embedment 29, rather than separate components.

Figure 3A:
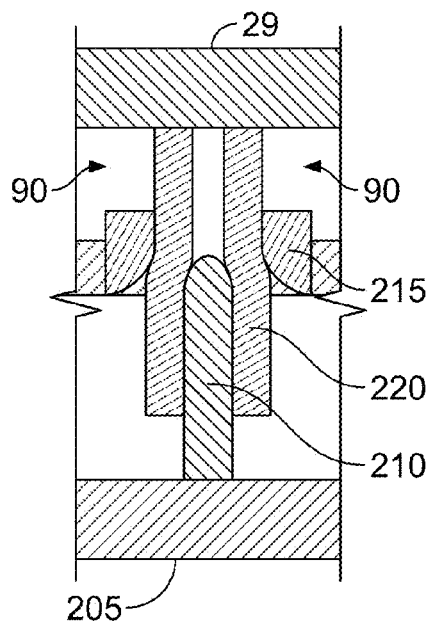
FIGS. 3A-3B illustrate portions of example implementations of a seismic isolation assembly.

Based on a sufficient seismic force, movement of the conical stretching elements 210 into the cylindrical plasticity elements 220 (e.g., into the bores 230 as shown in FIG. 3A) may result in semi-permanent or permanent plastic deformation of the cylindrical plasticity elements 220. Further, during (and after) plastic deformation of the cylindrical plasticity elements 220, seismic forces may also be dissipated through friction, and associated heat, between the conical stretching elements 210 and the cylindrical plasticity elements 220.

Figure 3B:
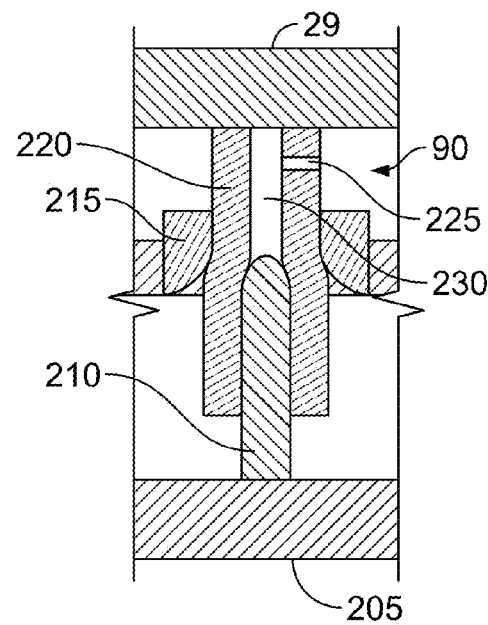

FIGS. 3A-3B illustrate portions of example implementations of the seismic isolation assembly 200. FIG. 3A shows a close-up view of the plastically deformable elements mounted in the enclosure 205. As further shown in FIG. 3A, portions of the enclosure 205 and the plastically deformable elements may be surrounded by the pool of liquid 90 (e.g., water or other fluid). As described above, the liquid 90 may be a hydraulic damping feature (e.g., represented by the damping coefficient, C, in FIG. 4) that helps dissipate seismic forces, as well as heat generated by frictional forces of the plastically deformable elements as they slide/deform in response to the seismic forces.

In some aspects, a bore 230 of the cylindrical plasticity element 220 may enclose a working fluid (e.g., a gas such as air, or a liquid such as water). The working fluid may provide further dissipative affects for any seismic forces received by the seismic isolation assembly 200. For example, the working fluid may dissipate some of the energy of the seismic event by compressing within the bore 230 as the conical stretching element 210 is forced into the bore 230 of the cylindrical plasticity element 220.

Turning to FIG. 3B, another implementation is shown that includes a fluid orifice 225 that fluidly connects the bore 230 and the reactor pool 90. In this aspect, the working fluid may be a portion of the pool 90. The working fluid, in both implementations shown in FIGS. 3A-3B, may provide further hydraulic damping to dissipate the seismic forces and movement due to such forces. For example, expelling the working fluid from the bore 230 during movement of the conical stretching element 210 into the bore 230 of the cylindrical plasticity element 220 may further dissipate seismic energy through hydraulic damping.

A number of implementations related to FIGS. 1-5 have been described. Nevertheless, it will be understood that various modifications may be made. For example, the steps of the disclosed techniques may be performed in a different sequence, components in the disclosed systems may be combined in a different manner, and/or the components may be replaced or supplemented by other components. Accordingly, other implementations are within the scope of the following examples.

A nuclear reactor seismic isolation assembly may include one or more deformable elements that, in response to energy generated by a seismic event and transmitted to the assembly through a structure that houses a nuclear reactor containment vessel, plastically deform to at least partially dissipate the seismic energy. In some aspects, portions of the energy are dissipated through the plastic deformation while other portions of the energy are dissipated through friction between two or more components of the assembly. In still other aspects, a working fluid may be compressed within the assembly to dissipate some of the seismic energy.

A nuclear reactor system may include one or more seismic isolation assemblies according to the present disclosure may limit a reaction force (or forces) on a structure (e.g., a containment pool structure or building structure) to a sliding force. The disclosed seismic isolation assemblies may be geographically neutral and thus be used world-wide in nuclear reactor systems. As another example, the seismic isolation assemblies may be passive isolators rather than active isolators, thereby reducing maintenance and inspection complexities (e.g., by limiting to visual inspection or otherwise). As another example, the disclosed seismic isolation assemblies may accommodate or promote a modular building design for nuclear reactor system structures.

A nuclear reactor seismic isolation assembly may comprise an enclosure that defines a volume and a plastically-deformable member mounted, at least in part, within the volume. A stretching member may be moveable within the enclosure to plastically-deform the plastically deformable member in response to a dynamic force exerted on the enclosure. The enclosure may be attachable to a portion of a nuclear reactor containment vessel. The dynamic force may comprise a seismically generated force.

In some examples, the plastically deformable member may comprise a first portion mounted within the enclosure and a second portion that extends through a die member to an exterior of the enclosure. The second portion may comprise a weldable portion. Additionally, the die member may be moveable with the stretching member in response to the dynamic force exerted on the enclosure.

The stretching member may be mounted within a portion of a bore that extends through the plastically-deformable member. The portion of the bore may comprise a first diameter approximately equal to an outer dimension of the stretching member, the bore comprising another portion that comprises a second diameter smaller than the first diameter. Additionally, the second diameter may be stretched to approximately equal the first diameter based on movement of the stretching element through the bore in response to the dynamic force exerted on the enclosure.

In some examples, the bore may at least partially enclose a working fluid that dissipates at least a portion of energy generated by the dynamic force exerted on the enclosure based on movement of the stretching element through the bore in response to the dynamic force exerted on the enclosure. The working fluid may comprise a portion of a fluid enclosed in a nuclear reactor bay.

A method for managing dynamic forces and/or for attenuating seismic forces may comprise receiving a force on a seismic isolation assembly in contact with a nuclear reactor pressure vessel, wherein the force may be generated at least in part by a seismic event. The received force may be transmitted through an enclosure of the seismic isolation assembly to a stretching member, and the stretching member may be moved within the enclosure based on the received force.

The method may further comprise plastically deforming a deformable member, that is at least partially enclosed in the enclosure, with the stretching member, and dissipating at least a portion of the received force based on plastically deforming the deformable member.

Additionally, the method may comprise generating friction between the deformable member and the stretching member based on repeated movement of the stretching member into the deformable member based on the received force, and dissipating another portion of the received force based on the generated friction.

In some examples, a working fluid enclosed in a chamber of the deformable element may be compressed based on movement of the stretching member into the deformable member based on the received force, and another portion of the received force may be dissipated based on the compression of the working fluid. The working fluid may be expelled to a reactor bay that encloses a liquid, through a fluid passageway that fluidly couples the chamber and the reactor bay. Additionally, another portion of the received force may be dissipated through the liquid enclosed in the reactor bay.

One or more spring members may be compressed based on movement of the stretching member into the deformable member based on the received force, and another portion of the received force may be dissipated based on the compression of the one or more spring members. In some examples, the received force may be transmitted through the deformable member that is in contact with a structure that houses the nuclear reactor pressure vessel.

A nuclear reactor system may comprise a reactor bay that encloses a liquid and a nuclear reactor containment vessel that is mounted within the reactor bay with lugs positioned in embedments of the reactor bay. Additionally, the system may comprise seismic isolation assemblies mounted in the embedments and between the lugs and walls of the embedments. Each of the seismic isolation assemblies may comprise an enclosure that defines a volume, a plastically-deformable member mounted, at least in part, within the volume, and a stretching member moveable within the enclosure to plastically-deform the plastically-deformable member in response to a dynamic force exerted on the reactor bay.

The plastically-deformable member may comprise a first portion mounted within the enclosure and a second portion that extends through a die member to a wall of one of the embedments. The second portion may be anchored to the wall. In some examples, the die member may be moveable with the stretching member in response to the dynamic force exerted on the reactor bay.

Additionally, the stretching member may be mounted within a portion of a bore that extends through the plastically deformable member. The portion of the bore may comprise a first diameter approximately equal to an outer dimension of the stretching member, and another portion that comprises a second diameter smaller than the first diameter. In some examples, the second diameter may be stretched to approximately equal the first diameter based on movement of the stretching element through the bore in response to the dynamic force exerted on the reactor bay.

The bore may at least partially enclose a working fluid that dissipates at least a portion of energy generated by the dynamic force exerted on the enclosure based on movement of the stretching element through the bore in response to the dynamic force exerted on the reactor bay. The nuclear reactor system may further comprise a passage that fluidly couples the bore to a volume defined by the reactor bay. The working fluid may comprise a portion of a fluid enclosed in the volume.

Figure 6:
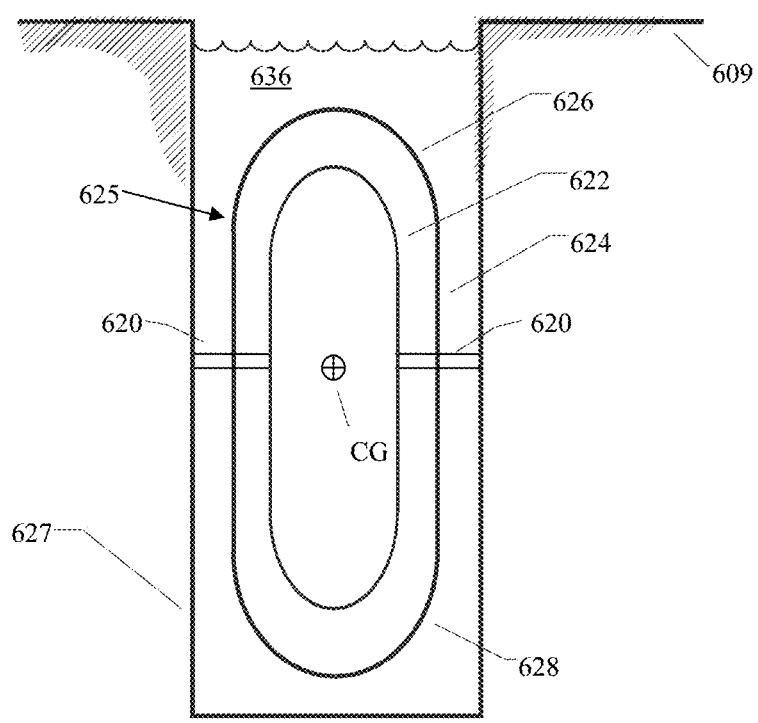
FIG. 6 illustrates an example power module assembly comprising a support structure.

FIG. 6 illustrates an example power module assembly comprising a containment vessel 624, reactor vessel 622 and a support structure 620. The containment vessel 624 may be cylindrical in shape, and may have ellipsoidal, domed or hemispherical upper and lower ends 626, 628. The entire power module assembly 625 may be submerged in a pool of liquid 636 (for example, water) which serves as an effective heat sink. In other examples, the power module assembly 625 may be partially submerged in the pool of liquid 636. The pool of liquid 636 is retained in reactor bay 627. The reactor bay 627 may be comprised of reinforced concrete or other conventional materials. The pool of liquid 636 and the containment vessel 624 may further be located below ground 609. In some examples, the upper end 626 of the containment vessel 624 may be located completely below the surface of the pool of liquid 636. The containment vessel 624 may be welded or otherwise sealed to the environment, such that liquids and gas do not escape from, or enter, the power module assembly 625.

The containment vessel 624 is shown suspended in the pool of liquid 636 by one or more support structures 620, above a lower surface of the reactor bay 627. The containment vessel 624 may be made of stainless steel or carbon steel, and may include cladding. The power module assembly 625 may be sized so that it can be transported on a rail car. For example, the containment vessel 624 may be constructed to be approximately 4.3 meters in diameter and 17.7 meters in height (length). Refueling of a reactor core may be performed by transporting the entire power module assembly 625 by rail car or overseas, for example, and replacing it with a new or refurbished power module assembly which has a fresh supply of fuel rods.

The containment vessel 624 encapsulates and, in some conditions, cools the reactor core. The containment vessel 624 is relatively small, has a high strength and may be capable of withstanding six or seven times the pressure of conventional containment designs in part due to its smaller overall volume. Given a break in the primary cooling system of the power module assembly 625 no fission products are released into the environment.

The power module assembly 625 and containment vessel 624 are illustrated as being completely submerged in the pool of liquid 636. All sides, including the top and bottom, of the containment vessel 624 are shown as being in contact with, and surrounded by, the liquid 636. However in some examples, only a portion of containment vessel 624 may be submerged in the pool of liquid 636. The one or more support structures 620 are located at an approximate midpoint of the containment vessel 624. In some examples, the one or more support structures 620 are located at an approximate center of gravity (CG), or slightly above the CG, of the power module 625. The power module 625 is supported by the support structure 620 in combination with a buoyancy force of the pool of liquid 636 acting on the containment vessel 624. In some examples, the power module assembly 625 is supported by two support structures 620. The first support structure may be located on a side of the power module assembly 625 opposite the second support structure.

The one or more support structures 620 may be configured to support both the containment vessel 624 and the reactor vessel 622. In s, the one or more support structures 620 are located at an approximate CG, or slightly above the CG, of the reactor vessel 622.

Figure 7:
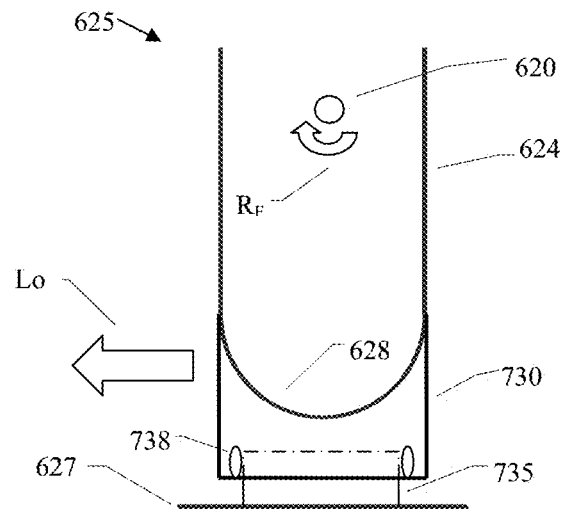
FIG. 7 illustrates a side view of the power module assembly of FIG. 6.

FIG. 7 illustrates a side view of the power module assembly 625 of FIG. 6. The containment vessel 624 as well as the reactor vessel 622, may be configured to pivot about the support structure 620, due to a rotational force RF acting on the power module 625. In some examples, the support structure 620 is located slightly above the CG of the power module 625, so that the lower end 628 tends to return to a bottom facing position within the reactor bay 627 due to gravity after the rotational force RF has subsided. The rotation of the containment vessel 624 also allows for greater maneuverability during installation or removal of the power module assembly 625 from the reactor bay 627. In some examples, the containment vessel 624 may be rotated between a vertical and a horizontal orientation or position of the power module assembly 625.

The power module 625 is further illustrated as comprising a base support, such as a base skirt 730, located at the lower end 628 of the containment vessel 624. The base skirt 730 may be rigidly mounted to, welded on, and/or form an integral part of, the containment vessel 624. In some examples, the base skirt 730 may be designed to support the weight of the power module 625 if the base skirt 730 is placed on the ground, on a transport device, or in a refueling station, for example. During normal operation (e.g. power operation) of the power module 625, the base skirt 730 may be suspended off the ground or positioned above the bottom of the reactor bay 627, such that the base skirt 730 is not in contact with any exterior component or surface.

When the power module 625 rotates about the support structure 620, the lower end 628 of the containment vessel 625 tends to move in a lateral or transverse direction Lo. The base skirt 730 may be configured to contact an alignment device 375 located in the pool of liquid 636 when the containment vessel 624 pivots a predetermined amount about the support structure 620. For example, the alignment device 735 may be sized so that the power module 625 is free to rotate within a range of motion or particular angle of rotation.

The alignment device 735 may comprise an exterior diameter that is smaller than an interior diameter of the base skirt 730. The alignment device 735 may be sized to fit within the base skirt 730, such that the base skirt 730 does not contact the alignment device 735 when the power module 625 is at rest. In some examples, the base skirt 730 may be configured to contact the alignment device 735 when the containment vessel 624 pivots about the support structure 620. The base skirt 730 may not inhibit a vertical range of motion of the containment vessel 623, in the event that a vertical force acts upon the power module 625. The alignment device 735 may be rigidly mounted (e.g. bolted, welded or otherwise attached) to the bottom of the reactor bay 627. In some examples, one or more dampeners 638 are located between the base skirt 730 and the alignment device 735 to attenuate a contact force between the base skirt 730 and the alignment device 735 when the power module 625 pivots or rotates. The one or more dampeners 738 may be mounted to or otherwise attached to either the alignment device 735 (as illustrated) or the base skirt 730.

Figure 8:
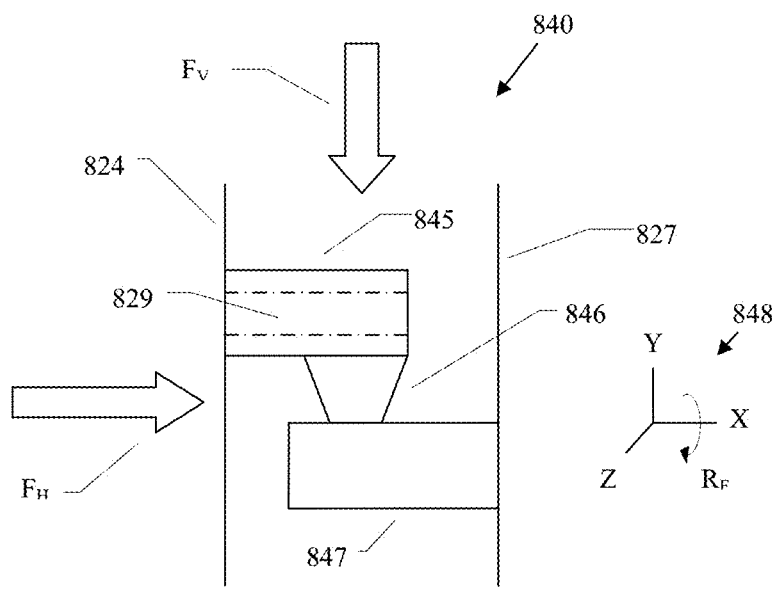
FIG. 8 illustrates a partial view of an example support structure for a power module assembly comprising a seismically isolated containment vessel.

FIG. 8 illustrates a partial view of an example support structure 840 for a power module assembly comprising a seismically isolated containment vessel 824. The support structure 840 comprises a support arm 845 and a mounting structure 847. The support arm 845 may be located at an approximate midpoint of the containment vessel 824. The mounting structure 847 may be submerged in liquid (for example water). Additionally, the mounting structure 847 may be an extension of, mounted to, recessed in, or integral with, the wall of the reactor bay 627 (FIG. 6).

A damping device 846 may be disposed between the support arm 845 and the mounting structure 847. At least a portion of the weight of the containment vessel 824 may be transferred to the support structure 847 through the damping device 846. Damping device 846 may be elastic, resilient or deformable, and may comprise a spring, pneumatic or hydraulic shock absorber, or other vibration or force attenuating device known in the art. In some examples, the damping device 846 comprises natural or synthetic rubber. The damping device 846 may comprise an elastic material that is manufactured from petroleum or other chemical compounds and that is resistant to material breakdown when exposed to radiation or humidity. In yet another example, the damping device 846 comprises soft deformable metal or corrugated metal.

The damping device 846 may be configured to attenuate dynamic or seismic forces transferred by and between the support arm 845 and the mounting structure 847. For example, a vertical or longitudinal force FV, acting along a longitudinal or lengthwise direction of the containment vessel 824, may act through the damping device 846. Additionally, a horizontal or transverse force FH may be exerted on the damping device 846 in any direction perpendicular to the longitudinal force FV. Transverse force FH may be understood to include a direction vector located in the plane defined by the X and Z coordinates of illustrative coordinate system 48, whereas the longitudinal force FV may be understood to include a direction vector oriented in the Y coordinate, the Y coordinate being perpendicular to the X-Z plane of the illustrative coordinate system 848.

In some examples, by placing the support arm 845 at an approximate center of gravity of the containment vessel 824, a transverse force FH acting on the power module 625 tends to cause the containment vessel 824 to slide rather than rotate. Locating the support arm 845 on the containment vessel 824 at a particular height or position provides for controllability for how the containment vessel 824 will behave when it is subjected to one or more forces FH, FV, or RF.

The damping device 846 may compress in a vertical direction to absorb or attenuate the longitudinal force FV. In some examples, the damping device 846 may be configured to compress or flex in a horizontal direction to attenuate the transverse force FH. Additionally, the damping device 846 may be configured to slide along the mounting structure 847 within the X-Z plane during a seismic activity, such as an earthquake or explosion. Forces FV and FH may also be understood to result from thermal expansion of one or more components of the power module 625, including containment vessel 824, in any or all of the three dimensions X, Y, Z.

As a result of the compression or movement of the damping device 846, less of the forces FV and FH are transferred from the mounting structure 847 to the containment vessel 824, or from the containment vessel 824 to the mounting structure 847. The containment vessel 824 experiences less severe shock than what might otherwise be transferred if the support arm 845 were rigidly mounted to, or in direct contact with, the mounting structure 847. The containment vessel 824 may be configured to rotate about the horizontal axis X, due to a rotational force RF acting on the power module 625 (FIG. 7).

Support arm 845 may be rigidly attached to the containment vessel 824. The one or more elastic damping devices 846 may be located between, and in contact with, both the support arm 845 and the mounting structure 847 located in the liquid 636 (FIG. 6). The elastic damping device 846 may provide a pivot point between the support arm 845 and the support structure 847, wherein the containment vessel 24 pivots or rotates about the elastic damping device 846, similar to that illustrated by FIG. 7. The weight of the containment vessel 824 may be supported, in part, by a buoyancy force of the liquid 636. The surrounding liquid 636 (FIG. 6) also serves to attenuate any of the transverse force FH, longitudinal force FV, and rotational force RF acting on the containment vessel 824.

In some examples, the support arm 845 comprises a hollow shaft 829. The hollow shaft 829 may be configured to provide a through-passage for an auxiliary or secondary cooling system. For example, piping may exit the containment vessel 824 via the hollow shaft 829.

Figure 9:
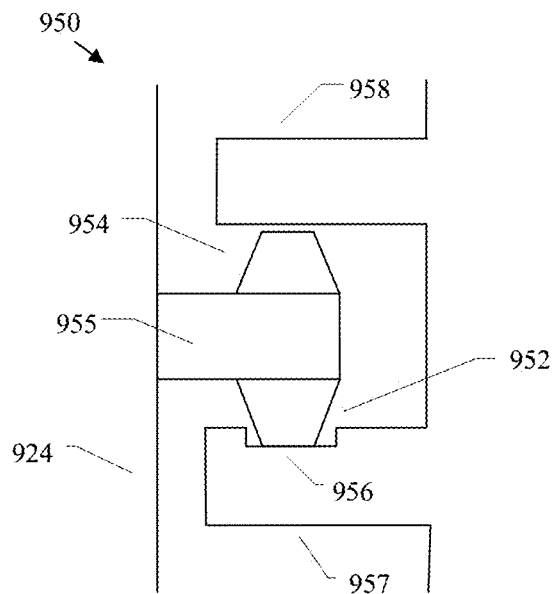
FIG. 9 illustrates a partial view of an example support structure for a seismically isolated containment vessel comprising multiple elastic damping devices.

FIG. 9 illustrates a partial view of a support structure 950 for a seismically isolated containment vessel 924 comprising a support arm 955 and multiple elastic damping devices 952, 954. The first elastic damping device 952 may be located between the support arm 955 and a lower mounting structure 957. The second elastic damping device 954 may be located between the support arm 955 and an upper mounting structure 958. In some examples, the first and second elastic damping devices 952, 954 are mounted to or otherwise attached to the support arm 955. In other examples, one or both of the first and second elastic damping devices 952, 954 are mounted to the lower and upper mounting structures 957, 958, respectively.

At least a portion of the weight of the containment vessel 924 may be transferred to the lower support structure 957 through the first elastic damping device 952. The first elastic damping device 952 may be under compression when the containment vessel 924 is at rest. The first elastic damping device 952 may be understood to attenuate longitudinal force acting between the support arm 955 and the lower mounting structure 957. The second elastic damping device 952 may also be understood to attenuate longitudinal force acting between the support arm 955 and the upper mounting structure 958. A longitudinal or vertical movement of the containment vessel 924 may be constrained by the lower and upper mounting structures 957, 958 as they come into contact with, or cause a compression of, the first and second elastic damping devices 952, 954, respectively. First and second elastic damping devices 952, 954 may provide similar functionality as a snubber or pair of snubbers in a conventional shock absorber.

In some examples, the lower mounting structure 957 comprises a recess 956. The recess 956 may be sized such that it has an interior dimension or diameter that is larger than an exterior dimension or diameter of the first elastic damping device 952. The first elastic damping device 952 is illustrated as being seated or located in the recess 956. The recess 956 may operate to constrain a movement of the containment vessel 924 in one or more lateral or transverse directions. The first elastic damping device 952 may be configured to compress or flex when it presses up against a wall of the recess 956. In some examples, the recess 956 may restrict an amount or distance that the first elastic damping device 952 is allowed to slide on the lower mounting structure 957 when the containment vessel 924 experiences lateral or transverse force.

Figure 10:
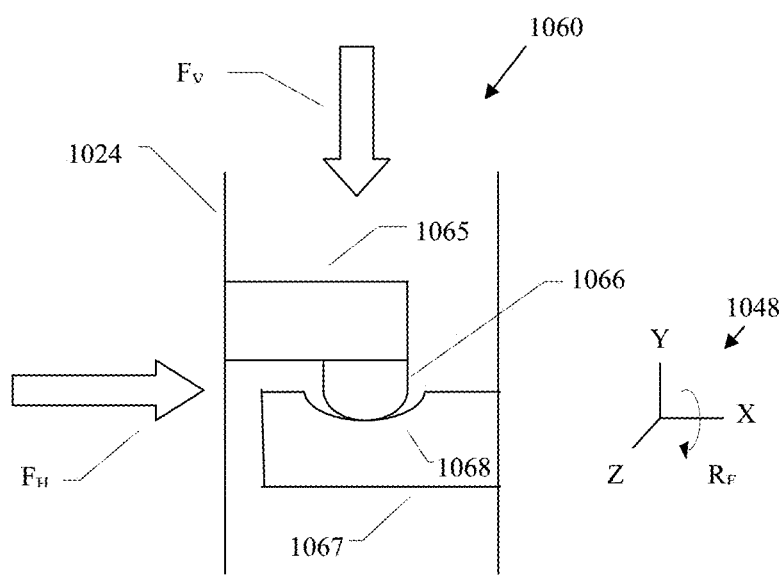
FIG. 10 illustrates a partial view of an example elastic damping and retaining structure.

FIG. 10 illustrates a partial view of an elastic damping and retaining structure 1060 for a seismically isolated containment vessel 1024. The damping and retaining structure 1060 comprises a deformable portion 1066. The deformable portion 1066 may be dome shaped, elliptical or hemispherical in shape. Mounting structure 1067 may comprise a recess 1068, and the deformable portion 1066 may be seated or located in the recess 1068. The deformable portion 1066 and recess 1068 may be understood to function similarly as a ball joint, wherein the deformable portion 1066 rotates or pivots within the recess 1068.

The recess 1068 is illustrated as being concave in shape. The mounting structure 1067 may be configured to constrain a movement of the containment vessel 1024 as a result of transverse force FH being applied in a lateral plane identified as the X-Z plane in the illustrative coordinate system 1048. Additionally, the mounting structure 1067 may be configured to constrain a longitudinal movement of the containment vessel 1024 as a result of a longitudinal force FV being applied in a direction Y perpendicular to the X-Z plane. The containment vessel 1024 may be configured to rotate about the horizontal axis X, due to a rotational force RF acting on the power module 625 (FIG. 7). In some examples, the recess 1068 forms a hemispherical, domed or elliptical bowl. A base support, such as base skirt 630 (FIG. 6), located at the bottom end of the containment vessel 1024 may be configured to constrains a rotation of the containment vessel 1024 as the deformable portion 1066 pivots or rotates in the recess 1068.

The mounting structure 1067 may be configured to support some or all of the weight of the power module. In some examples, a buoyancy force of the liquid 636 supports substantially all of the weight of the power module, such that the recess 1068 of the mounting structure 1067 may primarily operate to center or maintain a desired position of the power module.

Figure 11:
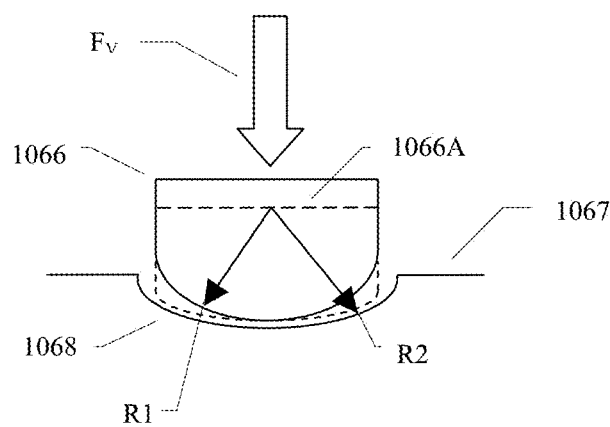
FIG. 11 illustrates a partial view of the elastic damping and retaining structure of FIG. 10 responsive to a longitudinal force.

FIG. 11 illustrates a partial view of the elastic damping and retaining structure 1060 of FIG. 10 responsive to a longitudinal force FV. The recess 1068 in the mounting structure 1067 may comprise a radius of curvature R2 that is greater than a radius of curvature R1 of the deformable portion 1066 of the damping and retaining structure 1060 when the containment vessel 1024 is at rest. Longitudinal force FV may be applied to support arm 1065 (FIG. 10) as a result of vertical movement of the containment vessel 1024, or as a result of force transmitted from the mounting structure 1067 to the containment vessel 1024. The longitudinal force may result from an earthquake or explosion for example.

When a dynamic longitudinal force FV is applied to the support arm 1065, the damping device may be configured to compress from a static condition illustrated in solid lines by reference number 1066, to a dynamic condition illustrated in dashed lines by reference number 1066A. The radius of curvature of the deformable portion 1066 temporarily approximates the radius of curvature R2 of the recess 1068 in the dynamic condition 1066A. As the effective radius of the deformable portion 1066 increases, this results in an increased contact surface to form between the deformable portion 1066 and the recess 1068. As the contact surface increases, this acts to resist or decrease additional compression of the deformable hemispherical portion 1066, and attenuates the longitudinal force FV. In some examples, the effective radius of curvature of the deformable hemispherical portion 1066 increases with an increase in longitudinal force FV. When the dynamic longitudinal force FV has attenuated, the deformable portion 1066 may be configured to retain its original radius of curvature R1.

Figure 12:
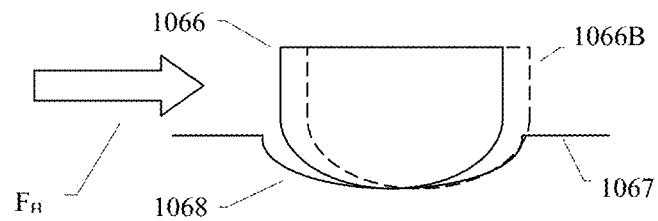
FIG. 12 illustrates a partial view of the elastic damping and retaining structure of FIG. 10 responsive to a transverse force.

FIG. 12 illustrates a partial view of the elastic damping and retaining structure 1060 of FIG. 10 responsive to a transverse force FH. The recess 1068 may be configured to constrain a movement of the deformable portion 1066 in at least two degrees of freedom. For example, the movement of the deformable portion 1066 may be constrained in the X and Z directions of the illustrative coordinate system 1048 of FIG. 10. The deformable portion 1066 may be configured to compress or flex when it presses up against a wall of the recess 1068. The compression or deformation of the deformable portion 1066 attenuates the horizontal force FH. In some examples, the recess 1068 may restrict an amount or distance that the deformable portion 1066 is allowed to slide on the mounting structure 1067 when the containment vessel 1024 experiences transverse force FH. When a transverse force FH is applied to the support arm 1065, the damping device moves or slides from the static condition illustrated in solid lines by reference number 1066, to the dynamic condition illustrated in dashed lines by reference number 1066B.

Whereas the recess 956, 1068 are illustrated in FIGS. 9 and 10 as being formed in the mounting structure 957, 1067, other examples may include where the recess 956, 1068 is formed in the support arm 955, 1065, and wherein the damping device 952, 1066 is mounted to the mounting structure 957, 1067. These alternate examples may otherwise operate similarly as the examples illustrated in FIG. 9 or 10, to constrain movement of the containment vessel 924, 1024 in one or both of the transverse and longitudinal directions.

Figure 13:
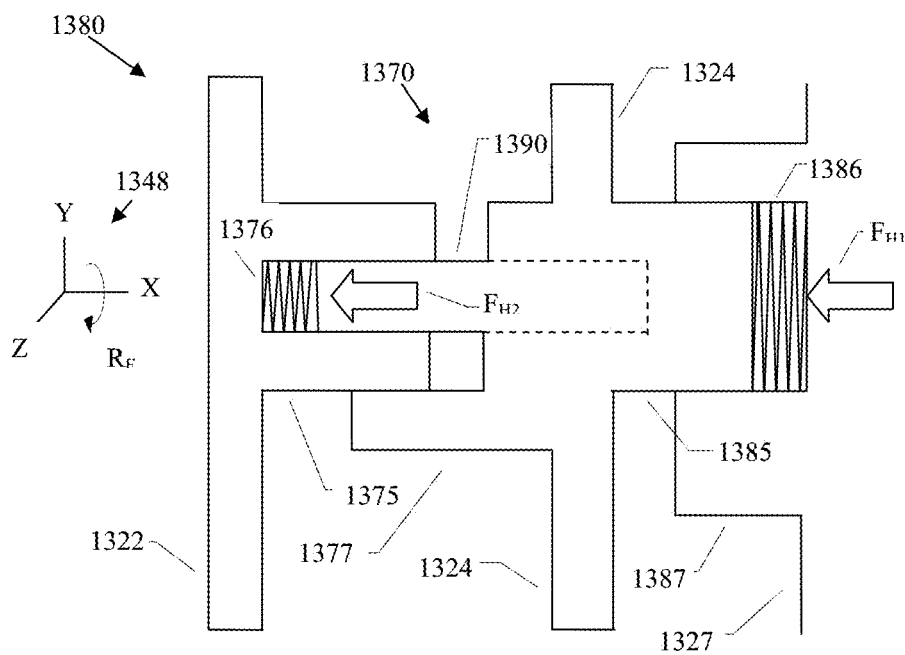
FIG. 13 illustrates a partial view of an example elastic damping and retaining structure for a seismically isolated power module.

FIG. 13 illustrates a partial view of an elastic damping and retaining structure 1370 for a seismically isolated power module 1380. The power module 1380 comprises a reactor vessel 1322 and a containment vessel 1324. The elastic damping and retaining structure 1370 comprises one or more support arms, or trunnions, and one or more mounting structures. A first trunnion 1375, protrudes or extends from the reactor vessel 1322. The reactor vessel trunnion 1375 provides similar functionality as one or more of the support arms described above with respect to FIGS. 6-10. A second trunnion 1385 protrudes or extends from the containment vessel 1324. The reactor vessel trunnion 1375 lies along the same, single axis of rotation as the containment vessel trunnion 1385. The axis of rotation X is shown in illustrative coordinate system 1348. One or both of the reactor vessel 1322 and containment vessel 1324 may rotate about the axis of rotation X when a rotational force RF acts on the power module 1325. The reactor vessel 1322 and containment vessel 1324 may rotate in the same or in opposite rotational directions from each other.

Reactor vessel trunnion 1375 is shown supported on a first mounting structure 1377. The mounting structure 1377 protrudes or extends from the containment vessel 1324. The reactor vessel trunnion 1375 may be configured to move or slide along the mounting structure 1377 when horizontal force FH1 or FH2 acts on the power module 1380. A first damping element 1376 may be configured to attenuate or reduce the impact of horizontal force FH2 transmitted by or between the reactor vessel 1322 and containment vessel 1324. The first damping element 1376 also helps to center or maintain a respective position or distance between the reactor vessel 1322 and containment vessel 1324 when the power module 1380 is at rest or in a static condition.

Containment vessel trunnion 1385 is shown supported on a second mounting structure 1387. In some examples, the mounting structure 1387 protrudes or extends from a reactor bay wall 1327. The containment vessel trunnion 1385 may move or slide along the mounting structure 1387 when horizontal force FH1 or FH2 acts on the power module 1380. A second damping element 1386 may be configured to attenuate or reduce the impact of horizontal force FH1 transmitted by or between the containment vessel 1324 and the reactor bay wall 1327. The second damping element 1386 also helps to center or maintain a respective position or distance between the containment vessel 1324 and the reactor bay wall 1327 when the power module 1380 is at rest or in a static condition.

The first damping element 1376 is shown housed in the reactor vessel trunnion 1375. A reactor vessel retaining pin 1390 is located in the reactor vessel trunnion 1375 to provide a contact surface for the first damping element 1376. The reactor vessel retaining pin 1390 may be an extension of the containment vessel 1324 or the containment vessel trunnion 1385, for example. In some examples, the reactor vessel retaining pin 1390 is rigidly connected to the containment vessel 1324. The reactor vessel retaining pin 1390 may extend through both sides of the containment vessel 1324.

Horizontal force FH2 may be transmitted by or between the reactor vessel 1322 and the containment vessel 1324 via the reactor vessel retaining pin 1390 and the first damping element 1376. Vertical movement of the reactor vessel 1322 and containment vessel may be constrained by the interaction between the reactor vessel trunnion 1375, reactor vessel retaining pin 90, and the mounting structure 1377. Vertical movement of the reactor vessel 1322 and containment vessel 1324 may be further constrained by the interaction between the containment vessel trunnion 1385 and the mounting structure 1387.

The elastic damping and retaining structure 1370 may further be configured to provide a thermal buffer for the power module 1380. In addition to attenuating, damping, or otherwise reducing dynamic and seismic forces from being transferred to or between the components of the power module 1380, the elastic damping and retaining structure 1370 may reduce the thermal heat transfer between the reactor vessel 1322 and the containment vessel 1324. For example, one or both of the first and second mounting structures 1377, 1387 may be lined with thermal insulation.

Figure 14:
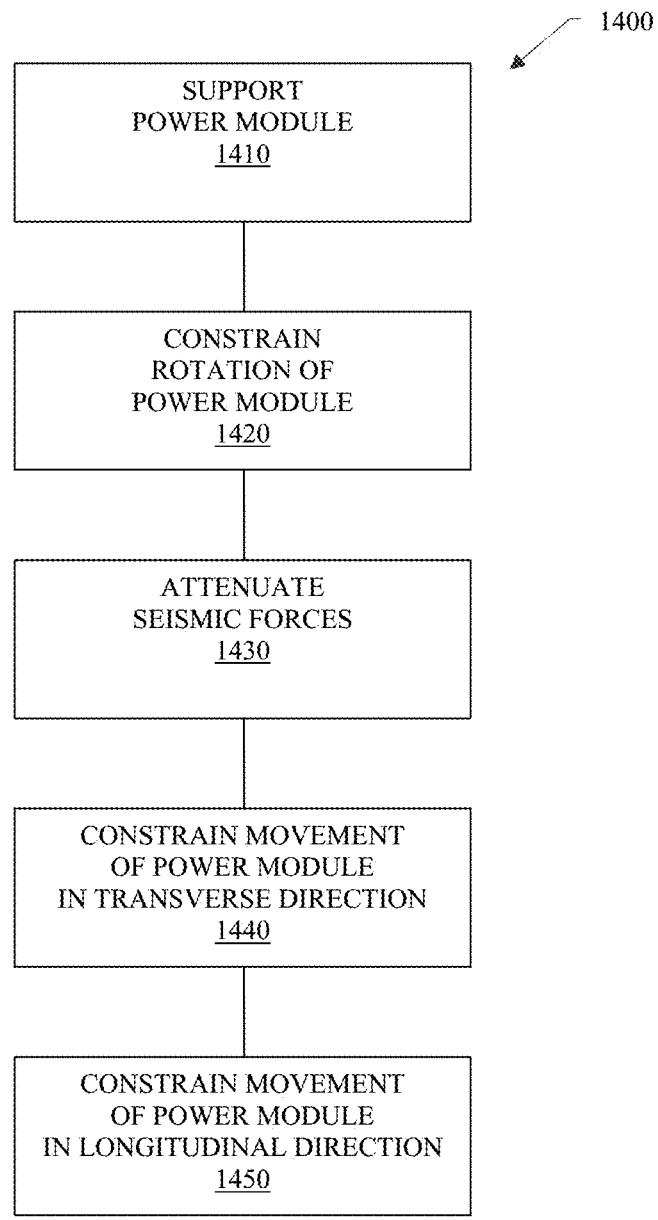
FIG. 14 illustrates an example system for seismically isolating a power module.

FIG. 14 illustrates an example process 1400 for seismically isolating a power module. The system 1400 may be understood to operate with, but not limited by, means illustrated or described with respect to the various examples illustrated herein as FIGS. 1-13.

At operation 1410, a power module is supported on a support structure. The support structure may be located at or slightly above an approximate midpoint, or an approximate center of gravity, of the power module.

At operation 1420, rotation of the power module is constrained. The support structure may serve as a pivot for the rotation.

At operation 1430, seismic forces transmitted through the support structure to the power module are damped or attenuated. In some examples, the seismic forces are attenuated by a damping device comprising an elastic material.

At operation 1440, movement of the power module in one or more transverse directions is constrained within a fixed range of motion. Upon an attenuation of a transverse force, the power module returns to its original at-rest position. In some examples, the damping device comprises a rounded surface, and the support structure comprises a rounded recess configured to house the rounded surface.

At operation 1450, movement of the power module in a longitudinal direction is constrained within a fixed range of motion. Upon an attenuation of a longitudinal force, the power module returns to its original at-rest position. The longitudinal directional is perpendicular to the one or more transverse directions of operation 1440.

A number of examples related to FIGS. 1-14 have been described. Nevertheless, it will be understood that various modifications may be made. For example, the steps of the disclosed techniques may be performed in a different sequence, components in the disclosed systems may be combined in a different manner, and/or the components may be replaced or supplemented by other components. Accordingly, other implementations are within the scope of the following examples.

A power module may comprise a containment vessel completely submerged in a pool of liquid, a reactor vessel housed in the containment vessel, and a support structure that comprises support arms coupled to opposed sides of the containment vessel. The pool of liquid may be disposed below a terranean surface, i.e., the pool may be subterranean. Additionally, the containment vessel may be configured to slide in a substantially lateral direction in response to a lateral force acting on the containment vessel.

The support structure may be located at an approximate midpoint of the containment vessel and configured to rotate at least one of the reactor vessel or the containment vessel about an axis that extends between the support arms and through the approximate midpoint of the containment vessel. Additionally, the power module may be supported by the support structure in combination with a buoyancy force of the pool of liquid acting on the containment vessel.

The support structure may comprise a first support structure disposed on a first side of the containment vessel, and the power module may further comprise a second support structure disposed on a second side of the containment vessel opposite the first side.

In some examples, the support structure may be located at or slightly above the approximate center of gravity of the power module. In some examples, the support structure may comprise an elastic damping device. The support arms may be rigidly attached to the containment vessel. Additionally, the elastic damping device may be located between and in contact with one of the support arms and a mounting structure in the pool of liquid.

The elastic damping device may be configured to compress in response to the support arm and the mounting structure being pressed together. Additionally, the elastic damping device may be configured to exert a reactionary force against at least one of the support arm and the mounting structure in response to the support arm and the mounting structure being pressed together In some examples, the mounting structure may be rigidly coupled to a reactor bay at least partially enclosing the pool of liquid, and the mounting structure may extend from a substantially vertical wall of the reactor bay to a location in the pool of liquid between the substantially vertical wall and the containment vessel. The support arm may comprise a hollow shaft. Additionally, the mounting structure may comprise a recess configured to receive a portion of the elastic damping device.

A pivot may be located at an interface between the support structure and the mounting structure. For example, the pivot may be located at or near the elastic damping device, and the containment vessel may be configured to rotate about the pivot in response to a rotational force acting on the containment vessel.

The power module may further comprise a base support or a base skirt located at a lower end of the containment vessel. The containment vessel may be configured to pivot about the support arm, and the base support may be configured to contact an alignment device in the pool of liquid if the containment vessel pivots about the support arm.

The base support may be rigidly coupled to the lower end of the containment vessel around a circumference of an outer surface of the containment vessel. The alignment device may extend into the pool of liquid from a bottom surface of a reactor bay at least partially enclosing the pool of liquid, and a top portion of the alignment devices may be disposed within a volume defined by the base support. Additionally, the power module may comprise at least one dampener disposed between the top portion of the alignment device and the base support, and within the volume of the base support.

The dampener may be configured to compress in response to contact between the alignment device and the base support, and the dampener may be configured exert a reactionary force against at least one of the alignment device or the base support, in response to the contact.

The power module may further comprise a first damping device interposed between the reactor vessel and the containment vessel, and a second damping device interposed between the containment vessel and a pool wall. The first and second damping devices may be configured to attenuate a dynamic force and/or seismic force acting on the power module.

Figure 15:
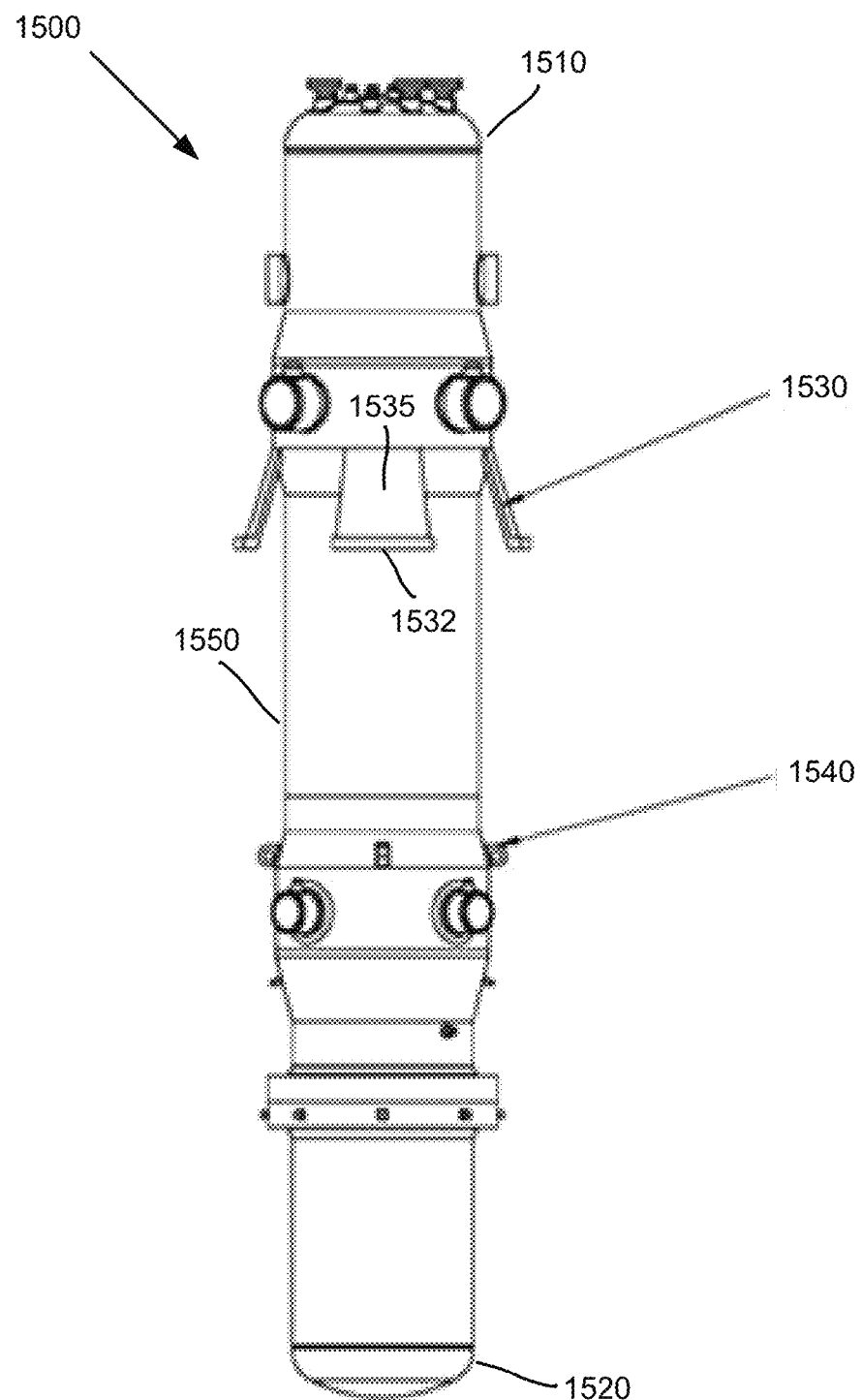
FIG. 15 illustrates an example reactor pressure vessel.

FIG. 15 illustrates an example reactor pressure vessel (RPV) 1500 comprising a top head 1510 and a bottom head 1520 mounted on either end of a substantially cylindrical shaped body 1550. Bottom head 1520 may be removably attached to body 1550 during assembly, installation, refueling, and/or other modes of operation of RPV 1500. Bottom head 1520 may be attached to body 1550 by a bolted flange. Additionally, RPV 1500 may comprise one or more support structures 1530 located about a circumference of body 1550. In some examples, RPV 1500 comprises four support structures 1530 located at ninety degree increments around body 1550.

Support structures 1530 may comprise a support member 1535 attached to RPV 1500 and one or more mounting bases 1532. Support member 1535 may be configured to extend away from body 1550 at an angle in order to provide a clearance between body 1550 and the one or more mounting bases 1532. For example, the one or mounting bases 1532 may be positioned so that they are radially located farther away from body 1550 than any other component of RPV 1500. Support structures 1530 may be configured to support RPV 1500 in a generally vertical, or longitudinal direction. In some examples, support structure 1530 may also be configured to support RPV 1500 in a generally horizontal direction, transverse direction, radial direction, and/or lateral direction.

Support structure 1530 may be configured to provide a thermal "anchor" for RPV 1500. For example, during thermal expansion of RPV 1500, there may be assumed to be no thermal expansion at the portion of RPV 1500 adjacent to support structure 1530, at least in a vertical or longitudinal direction. Rather, RPV 1500 may be understood to expand in a generally longitudinal direction as a function of the distance from support structure 1530. A top head of RPV 1500 may move upwards and a bottom head of RPV 1500 may move downwards, with respect to support structure 1530.

One or more radial mounts 1540 may also be mounted to body 1550. In some examples, RPV 1500 may comprise four radial mounts 1540 located at ninety degree increments around body 1550. Radial mounts 1540 may be configured to provide lateral and/or rotational support of RPV 1500. In some examples, radial mounts 1540 may be configured as radial links or lugs that project from body 1550. Radial mounts 1540 may be made operable with one or more of the seismic isolation and/or damping systems illustrated in FIGS. 1-14.

Figure 16:
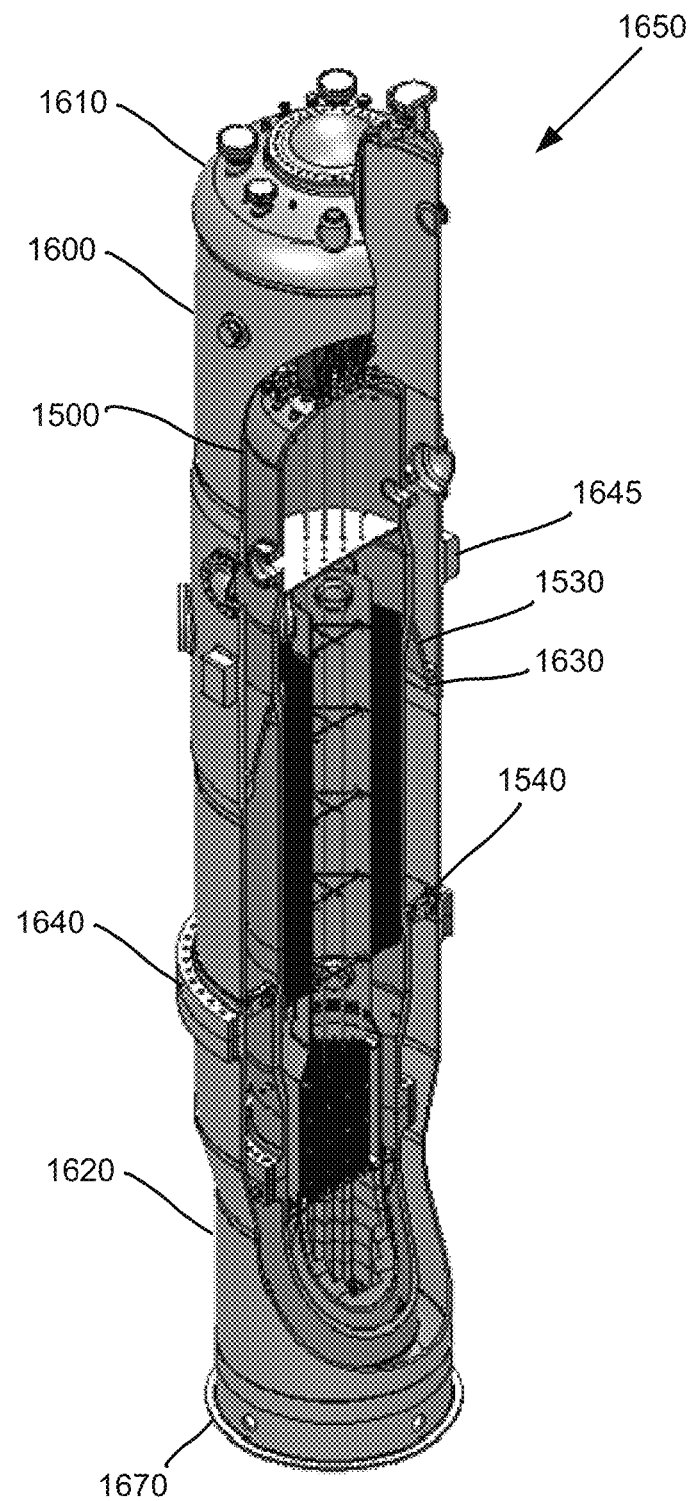
FIG. 16 illustrates a partial cut-away view of an example reactor module comprising a containment vessel and a reactor pressure vessel assembly.

FIG. 16 illustrates a partial cut-away view of an example reactor module 1650 comprising a containment vessel (CNV) 1600 and an RPV assembly, such as RPV 1500 of FIG. 15. CNV 1600 may be configured to support RPV 1500 at one or both of support structures 1530 and radial mounts 1540. CNV 1600 may comprise a platform 1630 which projects inward toward RPV 1500 and serves as a base for support structures 1530 to rest on. Support structures 1530 may be constrained in the vertical direction by platform 1630 and in the transverse or radial direction by the inner wall of CNV 1600. In other examples, a bolted interface may be used to transfer lateral loads from support structure 1530 to platform 1630. CNV 1600 may be configured to support the support structures 1530 of RPV 1500 at a steam generator plenum level of CNV 1600.

CNV 1600 may comprise a top head 1610 and a bottom head 1620. In some examples, bottom head 1620 may be removably attached to CNV 1600 at a bolted flange 1640. CNV 1600 may be configured to support radial mounts 1540 of RPV 1500 near flange 1640. Radial mounts 1540 may be constrained in a longitudinal direction, a radial direction, and/or a circumferential direction within CNV 1600. Radial mounts 1540 may be configured to allow for thermal expansion between RPV 1500 and CNV 1600. In some examples, radial mounts 1540 may be horizontally pinned between RPV 1500 and CNV 1660, at the bottom half of RPV 1500.

The seismic and/or dynamic loadings experienced by reactor module 1650 may result in fuel acceleration and/or fuel impact loads. Fuel accelerations in particular may be significantly decreased by the provision of supports, such as radial mounts 1540, located at or near the bottom half of RPV 1500.

CNV 1600 may be configured to contain and support RPV 1500. Additionally, CNV 1600 may house a reactor cooling system, internal piping, internal valves, and other components of reactor module 1650. Support structures 1530, in combination with radial mounts 1540, may be configured within reactor module 1650 to withstand loads due to thermal transients and expansion and to support lateral loads due to seismic and other dynamic loadings. For example, reactor module 1650 may be configured to withstand and/or respond to at least two types of seismic conditions, including a Safe Shutdown Earthquake (SSE) event and an Operating Basis Earthquake (OBE) event, as previously discussed.

Bottom head 1620 may comprise and/or be attached to a base support, such as a base skirt 1670. The base skirt 1670 may be rigidly mounted to, welded on, and/or form an integral part of, the CNV 1600. Base skirt 1670 may be configured to rest on the ground and/or on a lower surface of a reactor bay. In some examples, substantially all of the weight of reactor module 1650 may be supported by base skirt 1670.

One or more radial mounts 1645 may be mounted to CNV 1600. In some examples, CNV 1600 may comprise four radial mounts 1645 located at ninety degree increments. Radial mounts 1645 may be configured to primarily provide lateral and/or rotational support of CNV 1600. In some examples, radial mounts 1645 may be configured as radial links or lugs that project from CNV 1600. Radial mounts 1645 may be made operable with one or more of the seismic isolation and/or damping systems illustrated in FIGS. 1-14.

Figure 17:
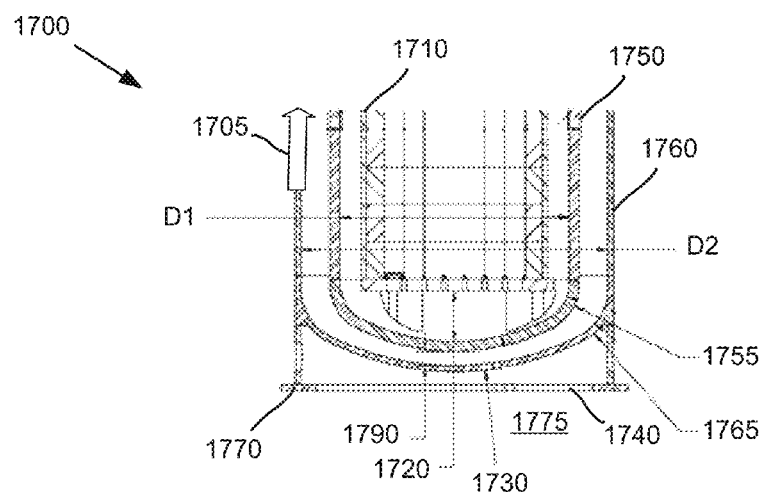
FIG. 17 illustrates a cross-sectional view of an example reactor module comprising a reactor pressure vessel and a containment vessel.

FIG. 17 illustrates a cross-sectional view of an example reactor module 1700 comprising an RPV 1750 and a CNV 1760. RPV 1750 may be associated with a first diameter D1 and similarly CNV 1760 may be associated with a second diameter D2 larger than first diameter D1. A bottom head 1755 of RPV 1750 may be separated or spaced apart from bottom head 1765 of CNV by a distance 1790. Distance 1790 may provide space for a thermal insulation to substantially envelop RPV 1750. In some examples, the thermal insulation may comprise a partial vacuum.

The space provided by distance 1790 may further be configured to provide for thermal expansion and/or thermal transients of RPV 1750 within CNV 1760. CNV 1760 may be at least partially submerged in water, and the amount of thermal expansion of RPV 1750 may be considerably larger than that of CNV 1760 based on the differences in operating temperature. Additionally, distance 1790 may provide clearance between RPV 1750 and CNV 1760 during a seismic event to keep the vessels from contacting each other.

A reactor core 1710 may be housed within RPV 1750. Reactor core 1710 may be spaced apart from RPV 1750 by a distance 1720. The space formed by distance 1720 may be configured to promote circulation of coolant within RPV 1750 to pass through reactor core 1710. Additionally, distance 1720 may provide clearance between RPV 1750 and reactor core 1710 during a dynamic event or a seismic event or to account for thermal expansion and/or thermal transients.

During a seismic event, seismic forces generated from within the ground 1775 and/or from below a support surface 1740, such as a floor of a surrounding containment building, may be transmitted to a base support, such as a base skirt 1770 of CNV 1760. The seismic forces may follow up through the container wall of CNV 1760 through a transmission path 1705 which may be transferred to RPV 1750 via one or more points of attachment, such as support structures 1530 and/or radial mounts 1540 (FIG. 15). Transmission path 1705 may represent at least a portion of an overall example path through which the seismic forces are transmitted, beginning with the source of the seismic forces and ultimately continuing on to the fuel assemblies located within RPV 1750. Other components may experience different example transmission paths.

A bottom surface 1730 of CNV 1760 may be located some distance above the ground 1775 and/or support surface 1740. In some examples, the space located between CNV 1760 and the support surface 1740 may provide room for surrounding water to cool the exterior surface of CNV 1760.

Figure 18:
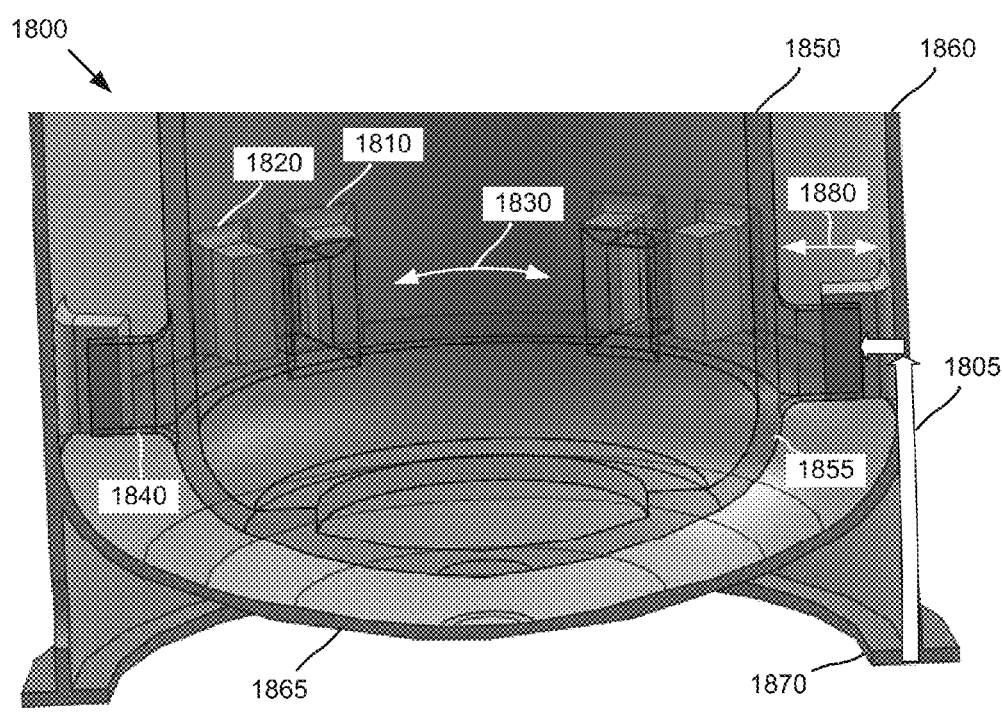
FIG. 18 illustrates an example system comprising radial keys.

FIG. 18 illustrates an example system 1800 comprising seismic attenuation devices configured as radial keys 1840. Radial keys 1840 may comprise one or more posts that extend outwardly from an RPV 1850 about its radius and engage one or more brackets, such as a first bracket 1810 and a second bracket 1820. The brackets may extend inwardly from a surrounding CNV 1860. Radial keys 1840 may be located at or near a bottom head 1855 of RPV 1850. Each of the radial keys 1840 may be inserted between a pair of brackets, such as first bracket 1810 and second bracket 1820. The brackets may be located at or near a bottom head 1865 of CNV 1860. In some examples, three or more radial keys may be spaced about the circumference of RPV 1850 to engage a corresponding number of bracket pairs located within the periphery of CNV 1860.

Radial keys 1840 may be configured to stabilize, dampen, attenuate, reduce, or otherwise mitigate any dynamic or seismic force experienced by RPV 1850. During a seismic event, radial keys 1840 may be configured to contact one or both of first bracket 1810 and second bracket 1820, to limit or prohibit movement/rotation of RPV 1850 in a circumferential direction 1830. Contact with one or more of the brackets may also impart friction force to resist or dampen movement of RPV 1650 in a transverse or radial direction 1880, e.g., towards the inner wall of CNV 1860. In some examples, the inner wall of CNV 1860 may inhibit the movement of RPV 1850 in the radial direction 1880.

A base support, such as a base skirt 1870 attached to the bottom of CNV 1860, may be configured to support the weight of the reactor module comprising CNV 1860 and RPV 850. During a seismic event, seismic forces may be transmitted from base skirt 1870 up through the container wall of CNV 1860 through a transmission path 1805 which may transfer the seismic forces to the radial keys 1840 of RPV 1850 via the one or more brackets, such as first bracket 1810 and/or second bracket 1820. Transmission path 1805 may represent at least a portion of an overall example path through which the seismic forces are transmitted, beginning with the source of the seismic forces and ultimately continuing on to the fuel assemblies located within RPV 1850.

By transmitting seismic forces to the RPV 1850 near the bottom head, transmission path 1805 may be considerably shorter than transmission path 1705 (FIG. 17). In some examples, decreasing the transmission path may result in a smaller amount of dynamic and/or seismic force that would otherwise be imparted to RPV 1750 and to any internal components, such as the reactor core and/or fuel rods. The amplitude and/or size of the dynamic/seismic forces may be amplified as a function of the length of the transmission path as the forces are transmitted from the ground or support surface to an RPV via one or more intermediate structures.

Figure 19:
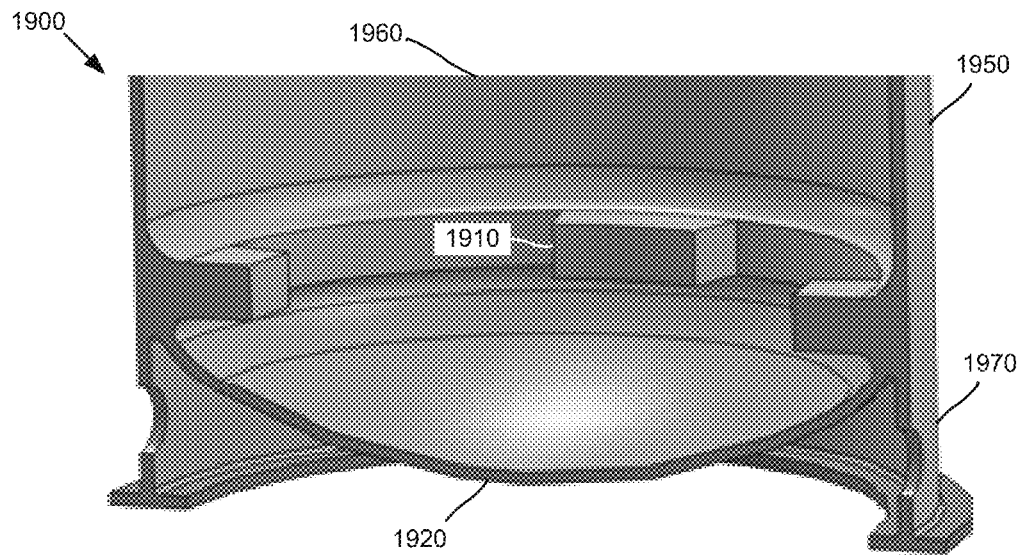
FIG. 19 illustrates an example system comprising radial bumpers.

FIG. 19 illustrates an example system 1900 comprising seismic attenuation devices configured as radial bumpers 1910. Radial bumpers 1910 may extend from an inner wall of a CNV 1960. A base support, such as a base skirt 1970 attached to the bottom of CNV 1960, may be configured to support the weight of the reactor module comprising CNV 1960. Radial bumpers 1910 may be attached to CNV 1960 at or near a bottom head 1920 of CNV 1960. In some examples, radial bumpers 1910 may be attached to a cylindrical wall 1950 of CNV 1960 located above base skirt 1970.

Figure 20:
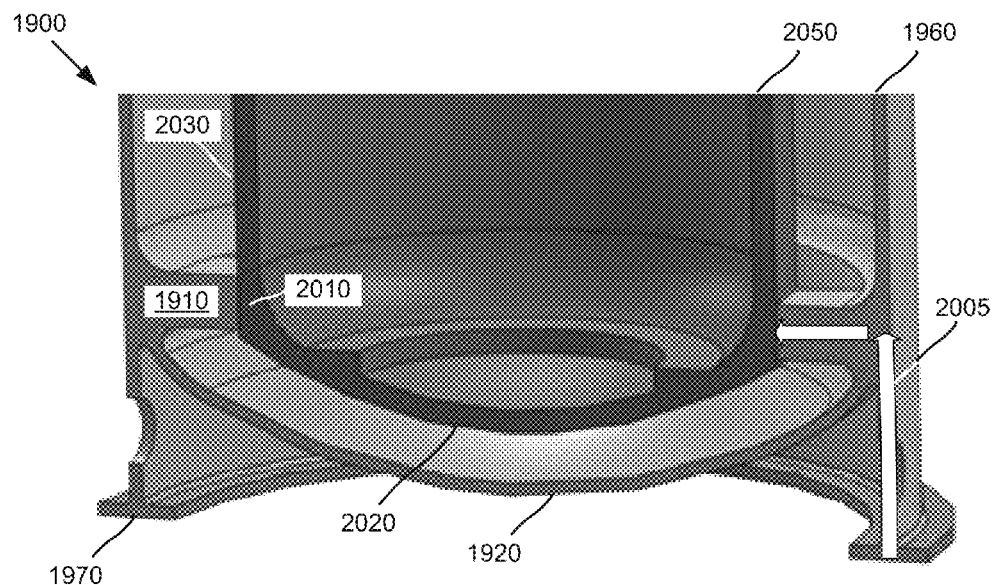
FIG. 20 illustrates the example system of FIG. 19 together with a reactor pressure vessel.

FIG. 20 illustrates the example system 1900 of FIG. 19 together with an RPV 2050. Radial bumpers 1910 may be configured to stabilize, dampen, attenuate, reduce, or otherwise mitigate any dynamic or seismic force experienced by RPV 1950. During a seismic event, radial bumpers 1910 may be configured to contact the outer surface of RPV 1950, and to limit or prohibit movement of RPV 1950 in a transverse or radial direction. Contact with one or more of the bumpers 1910 may also impart friction force to resist or dampen movement/rotation of RPV 1950 in a circumferential direction.

During a seismic event, seismic forces may be transmitted from base skirt 1970 up through the container wall of CNV 1960 through a transmission path 2005 which may transfer the seismic forces to RPV 2050 via the one of more radial bumpers 1910. In some examples, radial bumpers 1910 and/or radial keys 1840 (FIG. 18) may be configured to operate with and/or to comprise one or more of the seismic isolation and/or damping systems illustrated in one or more of FIGS. 1-14.

Figure 21:
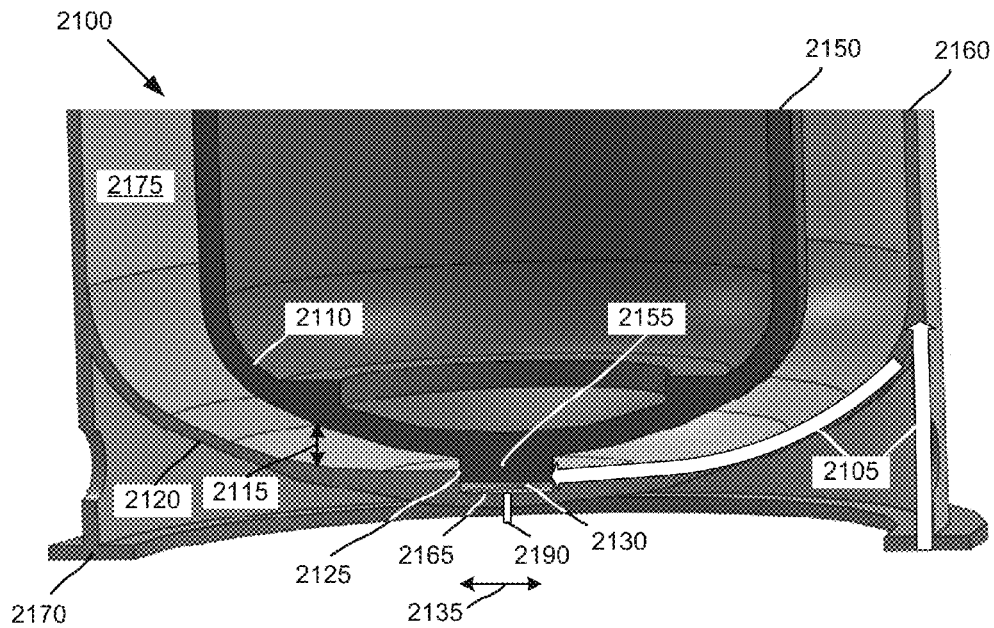
FIG. 21 illustrates an example system comprising a vertical key.

FIG. 21 illustrates an example system 2100 comprising a seismic attenuation device configured as a vertical key 2155. In some examples, vertical key 2155 may be configured as a round or conical post located on the bottom head 2110 of an RPV 2150. Vertical key 2155 may be configured to fit into a recess 2165 located at the bottom head 2120 of a CNV 2160. Recess 2165 may comprise a round hole sized to receive vertical key 2155.

Vertical key 2155 may be configured to provide lateral support of RPV 2150 in a transverse or radial direction 2135. Additionally, a gap 2130 may be provided between vertical key 2155 and recess 2165 to allow for thermal expansion of RPV 2150 in a longitudinal direction 2115. In some examples, gap 2130 may be approximately four to six inches in the longitudinal direction. During thermal expansion of RPV 2150, a larger portion of vertical key 2155 may be inserted into recess 2165, and effectively decrease gap 2130 by two or more inches. In some examples, RPV 2150 may expand due to an increase in internal pressure. Vertical key 2155 may remain at least partially inserted within recess 2165 when RPV 150 is at ambient temperature, e.g., at some nominal operation condition or at a minimum amount of thermal expansion.

The diameter associated with vertical key 2155 may be sufficiently less than the diameter of recess 2165 to provide for a clearance and/or tolerance during fit-up. In some examples, the diameter of vertical key 2155 may be between one and two feet and the clearance between vertical key 2155 and a contact point 2125 within recess 2165 may be approximately one eighth of an inch, one sixteenth of an inch, or less. In still other examples, the relative diameters may be only slightly different such that vertical key 2155 may be pressure-fit into recess 2165 with virtually no clearance.

The reactor module assembly may experience varying differential thermal growth depending if the reactor module is in shut down (i.e., cold) operating conditions, or in full power (i.e., hot) operating conditions. Accordingly, one or more of the seismic attenuation devices described above may be configured to stabilize, dampen, attenuate, reduce, or otherwise mitigate any dynamic or seismic force experienced by the RPV and/or the reactor core in both the hot and cold operating conditions. A radial gap and/or spacing between the one or more seismic attenuation devices and the adjacent vessel surface may be provided to accommodate the differential radial growth. In some examples, the radial gap between vertical key 2155 and contact point 2125 may be provided to allow for thermal expansion of vertical key 2155 in the radial direction 2135. The distance of the radial gap may vary according to the diameter of the vertical key.

Vertical key 2155 may be inserted and/or removed from recess 2165 during assembly, installation, refueling, and/or other modes of operation. The system 2100 illustrated in FIG. 21 may be configured to assemble RPV 2150 together with CNV 2160 independently of circumferential alignment. For example, vertical key 2155 may be configured to be installed into recess 2165 regardless of the rotational orientation of RPV 2150. Additionally, the lower corner(s) of vertical key 2155 may be tapered to facilitate alignment and/or entry into recess 2165.

Vertical key 2155 may be configured to stabilize, dampen, attenuate, reduce, or otherwise mitigate any dynamic or seismic force experienced by RPV 2150. During a seismic event, vertical key 2155 may be configured to contact recess 2165 at one or more lateral contact points 2125, to limit or prohibit movement/rotation of RPV 2150 in the radial direction 2135. In some examples, contact between vertical key 2155 and recess 2165 may also impart friction force to resist rotational movement of RPV 2150 within CNV 2160 and/or to resist vertical movement of RPV 2150 in the longitudinal direction 2115.

A base support, such as a base skirt 2170 attached to the bottom of CNV 2160, may be configured to support the weight of the reactor module comprising CNV 2160 and RPV 2150. During a seismic event, seismic forces may be transmitted from base skirt 2170 through a transmission path 2105 which may transfer the seismic forces to the vertical key 2155 of RPV 2150 via the one or more lateral contact points 2125 within recess 2165.

Vertical key 2155 may extend downward from the RPV 2150 at the longitudinal centerline of the bottom head 2110. The bottom head 2120 of CNV 2160 may be reinforced, such as by adding material or increasing the thickness of the wall of bottom head 2120. In some examples, recess 2165 may be machined out of the inner surface of the bottom head 2120 of CNV 2160.

Locating a seismic attenuation device, such as vertical key 2155, at the bottom head 2110 of RPV 2150 may significantly reduce the seismic acceleration and impact load on the fuel assemblies (e.g. by six times or more) as compared to using radial mounts 1540 as illustrated in FIG. 15. A relatively shorter transmission path may effectively eliminate or lower the transmissibility of forces as compared to a transmission path which passes through one or more sub-systems that are located between the source (ground motion) and the fuel assemblies.

In some examples, vertical key 2155 may be forged as an integral part of the bottom head 2110 of RPV 2150. In examples where vertical key 2155 is attached, e.g., welded, to bottom head 2110, vertical key 2155 may be made out of the same material as bottom head 2110. For example, RPV 2150, bottom head 2110, and/or vertical key 2155 may be made from SA-508, Grade 3, Class 1 steel forgings or other suitable materials.

A suction line 2190 may be configured to remove fluid located within recess 2165. In some examples, an annular space 2175 between RPV 2150 and CNV 2160 may be evacuated during operation of the reactor module. The removal of fluid and/or gases through suction line 2190 may facilitate creating and/or maintaining an evacuation chamber which substantially surrounds RPV 2150.

Figure 22:
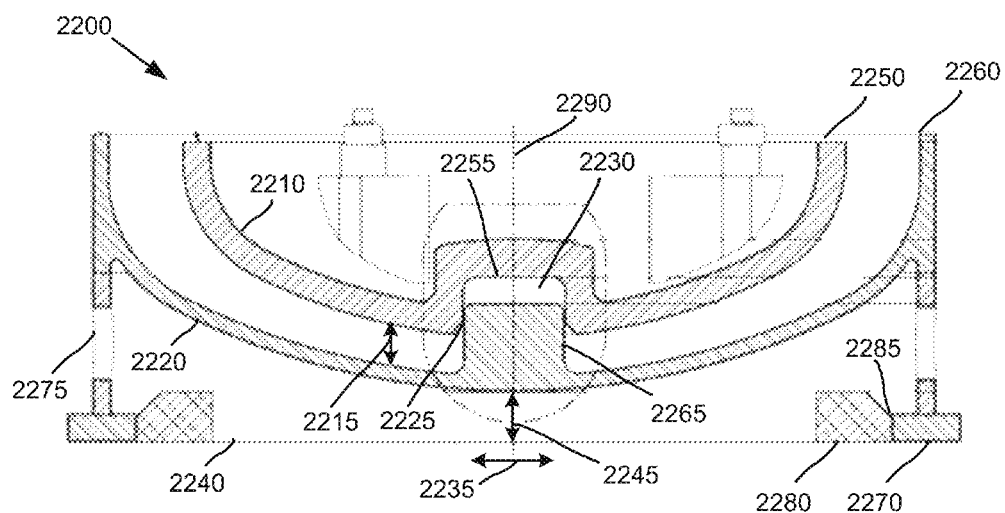
FIG. 22 illustrates a further example system comprising a vertical key.

FIG. 22 illustrates a further example system 2200 comprising a seismic attenuation device configured as a vertical key or post 2265. In some examples, vertical key 2265 may be configured as a round or conical post located on the bottom head 2220 of a CNV 2260. Vertical key 2265 may be configured to fit into a recess 2255 located at the bottom head 2210 of an adjacent RPV 2250. Recess 2255 may comprise a round hole sized to receive vertical key 2265.

Vertical key 2265 may be configured to provide lateral support of RPV 2250 in a transverse or radial direction 2235. Additionally, a gap 2230 may be provided between vertical key 2265 and recess 2255 to allow for thermal expansion of RPV 2250 in a longitudinal direction 2215. The diameter associated with vertical key 2265 may be sufficiently less than the diameter of recess 2255 to provide for a clearance and/or tolerance during fit-up. In some examples, the clearance may be approximately one sixteenth of an inch or less. In still other examples, the relative diameters may be only slightly different such that vertical key 2265 may be pressure-fit into recess 2255 with virtually no clearance.

Vertical key 2265 may be inserted and/or removed from recess 2255 during assembly, installation, refueling, and/or other modes of operation. The system 2200 illustrated in FIG. 22 may be configured to assemble RPV 2250 together with CNV 2260 independently of circumferential alignment. For example, vertical key 2265 may be configured to be installed into recess 2255 regardless of the rotational orientation of RPV 2250. Additionally, the lower corner(s) of vertical key 2265 may be tapered to facilitate alignment and/or entry into recess 2255.

Vertical key 2265 may be configured to stabilize, dampen, attenuate, reduce, or otherwise mitigate any dynamic or seismic force experienced by RPV 2250. During a seismic event, vertical key 2265 may be configured to contact recess 2255 at one or more lateral contact points 2225, to limit or prohibit movement/rotation of RPV 2250 in the radial direction 2235. In some examples, contact between vertical key 2265 and recess 2255 may also impart friction force to resist rotational movement of RPV 2250 within CNV 2260 and/or to resist vertical movement of RPV 2250 in the longitudinal direction 2215.

Vertical key 2230 may extend upward from CNV 2260 at a longitudinal centerline 2290 of the bottom head 2220. The bottom head 2210 of RPV 2250 may be reinforced, such as by adding material or increasing the thickness of the wall of bottom head 2210. In some examples, recess 2255 may be machined out of the outer surface of the bottom head 2220 of RPV 2250.

A base support, such as a base skirt 2270 attached to the bottom of CNV 2260, may be configured to support the weight of the reactor module comprising CNV 2260 and RPV 2250. During a seismic event, seismic forces may be transmitted from base skirt 2270 through bottom head 2220 to RPV 2250 via the transmission of forces from vertical key 2230 to one or more lateral contact points 2225 within recess 2255.

Base skirt 2270 may rest on a floor 2240 comprising reinforced concrete. Additionally, base skirt 2270 may comprise an annular shaped structure connected to the circumference of bottom head 2220. Base skirt 2270 may be configured to be placed next to one or more stops 2280. In some examples, the one or more stops 2280 may comprise an annular ring-shaped structure attached to the floor 2240. The one or more stops 2280 may be configured to align RPV 2250 when it is placed on the floor 2240. Additionally, the one or more stops 2280 may be configured to restrict and/or prohibit lateral movement of CNV 2260 in the radial direction 2235.

The bottom head 2220 of CNV 2260 may be located some distance 2245 above the floor 2240 upon which base skirt 2270 is placed on. In some examples, distance 2245 may be between six inches and one foot. The space located between CNV 2260 and the floor 2240 may provide room for surrounding water to cool the exterior surface of CNV 2260. Additionally, base skirt 2270 may comprise one or more through holes 2275 to allow the water to enter the space within base skirt 2270 in order to cool bottom head 2220.

In some examples, vertical key 2265 may be forged as an integral part of the bottom head 2220 of CNV 2260. In examples where vertical key 2265 is attached, e.g., welded, to bottom head 2220, vertical key 2265 may be made out of the same material as bottom head 2220. For example, CNV 2260, bottom head 2220, and/or vertical key 2255 may be made from SA-508, Grade 3, Class 1 steel forgings, or other suitable materials.

Providing radial spacing and/or clearance about vertical key 2265 may provide for some slight lateral movement of RPV 2250 within CNV 2260 to provide a flexible, or non-rigid stability system. While RPV 2250 may be allowed to move, it may nevertheless be constrained by recess 2255 to limit the amount of lateral movement. A flexible stability system may impart and/or transmit less force than a rigidly connected system.

One or more of the a seismic attenuation devices described above may be configured to stabilize, dampen, attenuate, reduce, or otherwise mitigate any dynamic or seismic forces, such as in the lateral or radial direction, without restraining the differential thermal growth between the RPV and the CNV. For example, the thermal growth of the RPV, such as RPV 2250, may be based on a temperature change between ambient conditions and the design temperature of the reactor module, which in some examples may be approximately 650° F. On the other hand, the thermal growth of the CNV, such as CNV 2260 may be essentially non-existent when the CNV is submerged in, or at least partially surrounded by, a pool of water that is near ambient temperature.

By attaching vertical key 2265 to CNV 2260, the thermal expansion of RPV 2250 may result in the internal diameter of recess 2230 increasing, whereas the external diameter of vertical key 2265 may remain essentially constant, independent of operating temperatures within RPV 2250. Accordingly, the lateral clearance between vertical key 2265 and recess 2230 could be made just large enough to facilitate assembly and/or fit-up, but would not necessarily need to account for thermal expansion of RPV 2250 and/or vertical key 2265 in the radial direction 2235. In some examples, RPV 2250 and CNV 2260 may be considered essentially thermally isolated from each other, regardless of any incidental contact between vertical key 2265 and recess 2230.

Figure 23:
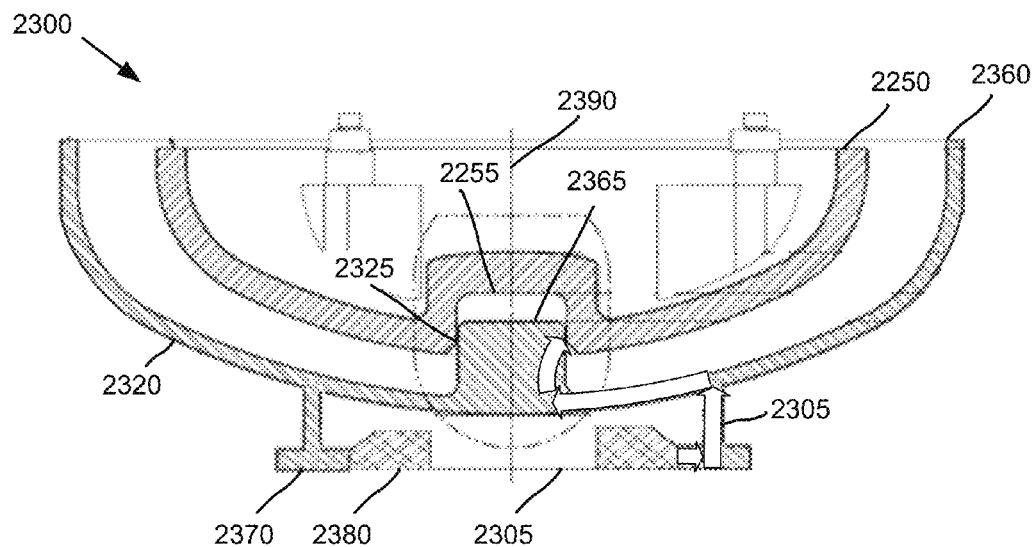
FIG. 23 illustrates an example system comprising a vertical key with an alternative force transmission path.

FIG. 23 illustrates an example system 2300 comprising a seismic attenuation device configured as a vertical key or post 2365 with an alternative force transmission path 2305. During a seismic event, seismic forces may be transmitted from one or more stops 2380 and/or the ground 2305 to a base support such as a base skirt 2370. Laterally transmitted forces from the one or more stops 2305 to base skirt 2370 may travel through transmission path 2305 and continue along a bottom head 2320 of a CNV 2360 before being transferred to RPV 2250 via the one or more lateral contact points 2325 between recess 2255 of RPV 2250 and the radial surface of vertical key 2365.

By locating base skirt 2370 closer to a longitudinal centerline 2390 of RPV 2250 and/or CNV 2360, where vertical key 2365 and or recess 2255 may be aligned, the transmission path 2305 between the one or more stops 2380 and RPV 2250 may be made shorter as compared to a transmission path associated with system 2200 (FIG. 22).

Figure 24:
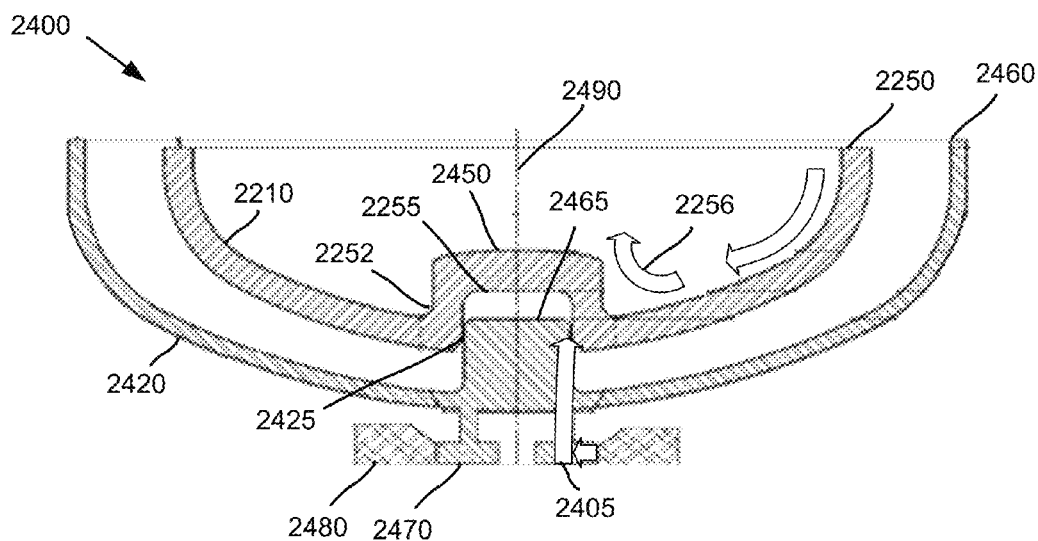
FIG. 24 illustrates a further example system comprising a vertical key with an alternative force transmission path.

FIG. 24 illustrates a further example system 2400 comprising a seismic attenuation device configured as a vertical key or post 2465 with an alternative force transmission path 2405. During a seismic event, lateral forces may be transmitted from one or more stops 2470 to a base support such as a base skirt 2470. Transmission path 2405 may continue from base skirt 2470 in a substantially linear direction both through a bottom head 2420 of CNV 2460 and through vertical key 2465 before being transferred to RPV 2250 via the one or more lateral contact points 2425 between recess 2255 of RPV 2250 and the radial surface of vertical key 2465.

By locating base skirt 2470 closer to a longitudinal centerline 2490 of RPV 2250 and/or CNV 2460, the transmission path 2405 associated with system 2400 may be made shorter as compared to the transmission path 2305 associated with system 2300 (FIG. 23). In some examples, base skirt 2470 may be located directly below at least a portion of radial key 2465. In other examples, base skirt 2470 may be located directly below at least a portion of recess 2255. Transmission path 2405 may be understood to provide an essentially direct, linear path from the ground, or support surface, to RPV 2250.

In some examples, recess 2255 may be formed in a boss 2450 which extends from bottom head 2210 into the interior of RPV 2250. Boss 2450 may comprise one or more curved or sloped surfaces 2252 which are configured to direct coolant flow 2256 in an upward direction to facilitate uniform mass flow distribution of coolant entering the reactor core. In some examples, boss 2450 may be configured to direct at least a portion of coolant flow 2256 to a periphery of the reactor core.

Figure 25:
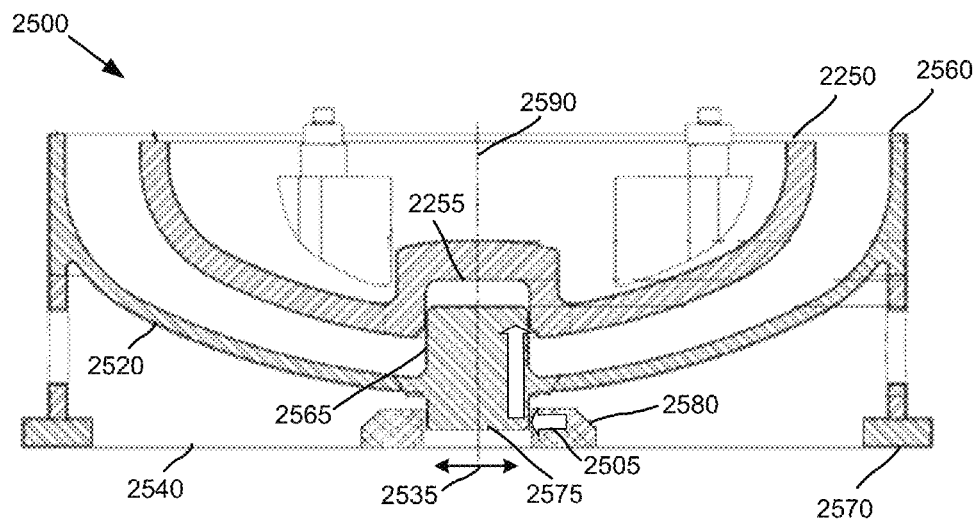
FIG. 25 illustrates an example system comprising an integrated vertical key and lateral support.

FIG. 25 illustrates an example system 2500 comprising a seismic attenuation device configured as an integrated vertical key 2565 and lateral support 2575. Vertical key 2565 may extend upward in a substantially vertical direction from the inner surface of a CNV 2560 into the adjacent recess 2255 of RPV 2250 contained within CNV 2560. Lateral support 2575 may extend downward in a substantially vertical direction from the outer surface of CNV 2560 towards a support surface 2540. In some examples, both vertical key 2565 and lateral support 2575 may be vertically aligned along a longitudinal centerline 2590 of one of both of CNV 2560 and RPV 2250.

The weight of RPV 2250 may be primarily supported by a base support such as base skirt 2570, similar to base skirt 1970 of FIG. 19. System 2500 may comprise a force transmission path 2505. During a seismic event, lateral forces may be transmitted from one or more stops 2580 to lateral support 2575. Transmission path 2505 may continue from lateral support 2575 in a substantially linear direction both through a bottom head 2520 of CNV 2560 and through vertical key 2565 before being transferred to RPV 2250 via one or more lateral contact points between recess 2255 of RPV 2250 and a radial surface of vertical key 2565.

In some examples, lateral support 2575 may be located directly below at least a portion of radial key 2565 and/or recess 2255. Transmission path 2505 may be understood to provide an essentially direct, linear path from support surface 2540 to RPV 2250. Lateral support 2575 may be configured to contact the one or more stops 2580 without directly contacting support surface 2540. In some examples, neither vertical key 2565 nor lateral support 2575 are configured to support any of the weight of RPV 2250 or CNV 2560.

Figure 26:
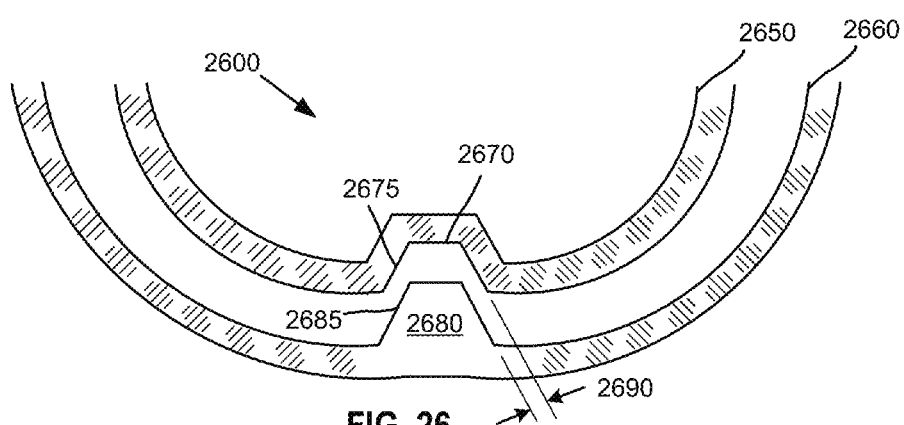
FIG. 26 illustrates an example system comprising a conical shaped key.

FIG. 26 illustrates an example system 2600 comprising an attenuation device configured as a vertical key 2680 having a conical shaped surface 2685. Key 2680 may be configured to fit within a recess 2670 having a complimentary shaped conical inner surface 2675. The sloped or angled contour of conical surfaces 2675, 2685 may provide for a lateral clearance 2690 between key 2680 and recess 2670. Additionally, the conical surfaces 2675, 2685 may facilitate fit-up and/or assembly of a reactor module comprising an RPV 2650 and a surrounding CNV 2660. In some examples, FIG. 26 may be considered as illustrating a reactor module comprising RPV 2650 and/or CNV 2660 in a nominal or non-expanded state.

Figure 27:
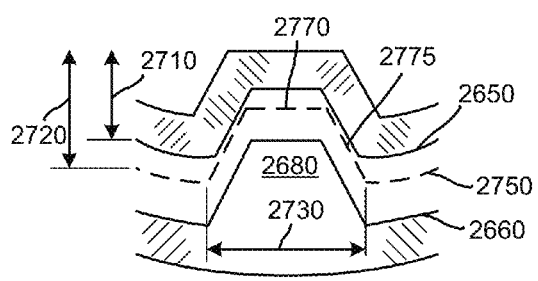
FIG. 27 illustrates an enlarged partial view of the example system of FIG. 26 with the RPV undergoing thermal expansion.

FIG. 27 illustrates an enlarged partial view of the example system 2600 of FIG. 26 with RPV 2650 undergoing thermal expansion. The thermally expanding RPV 2750 is shown in dashed lines, indicating thermal expansion in both a longitudinal direction and radial direction. For example, a first length 2710 associated with RPV 2650 may increase to a second length 2720 associated with thermally expanding RPV 2750. Similarly, RPV 2650 may expand in the radial direction as illustrated by the enlarged diameter 2730 associated with a thermally expanded recess 2770 including an enlarged conical shaped surface 2775.

Figure 28:
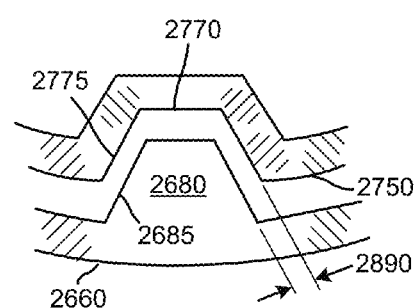
FIG. 28 illustrates an enlarged partial view of the example system of FIG. 26 in an expanded state.

FIG. 28 illustrates an enlarged partial view of the example system 2600 of FIG. 26 in an expanded state. The sloped or angled contour of conical surfaces 2685, 2775 may provide for a lateral clearance 2890 between key 2680 of CNV 2660 and thermally expanded recess 2770. The lateral clearance 2890 associated with a thermally expanded RPV 2750 may be approximately equal to the lateral clearance 2690 associated with RPV 2650 (FIG. 26) in the nominal or non-expanded state. In some examples, lateral clearance 2890 may be approximately one sixteenth of an inch or less. In other examples, lateral clearance 2890 may be approximately one eighth of an inch or less. Other and/or larger dimensions are also contemplated herein. Maintaining a lateral clearance at less than some predetermined dimension may effectively make any lateral movement between key 2680 and recess 2670 negligible with respect to determining dynamic impact forces between RPV 2650 and CNV 2660.

Figure 29:
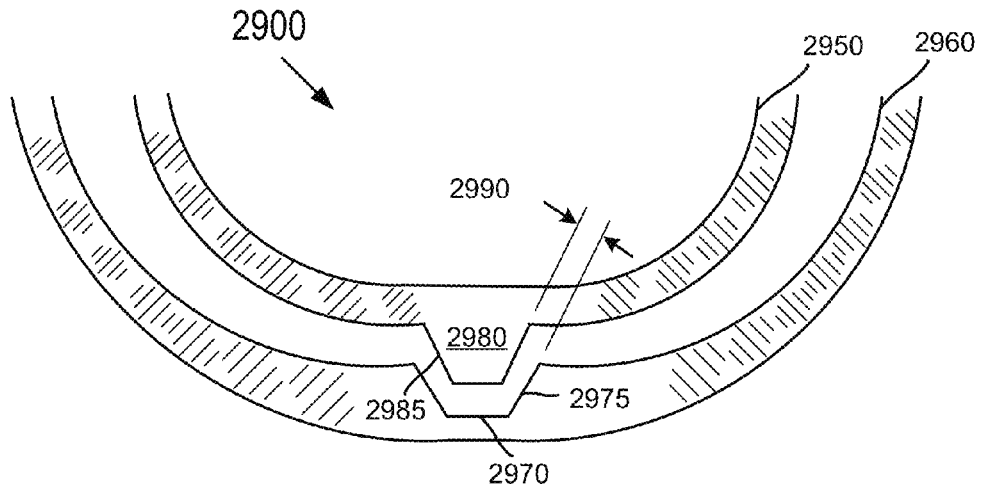
FIG. 29 illustrates a further example system comprising a conical shaped key.

FIG. 29 illustrates a further example system 2900 comprising an attenuation device configured as a conical shaped key 2980 having a conical shaped surface 2985. Key 2980 may be configured to fit within a recess 2970 having a complimentary shaped conical inner surface 2975. Key 2980 may extend downward in a substantially vertical direction from the outer surface of an RPV 2950 into the adjacent recess 2970 of a surrounding CNV 2960. The sloped or angled contour of conical surfaces 2975, 2985 may provide for a lateral clearance 2990 between key 2980 and recess 2970. Additionally, the conical surfaces 2975, 2985 may facilitate fit-up and/or assembly of a reactor module comprising RPV 2950 and CNV 2960.

Figure 30:
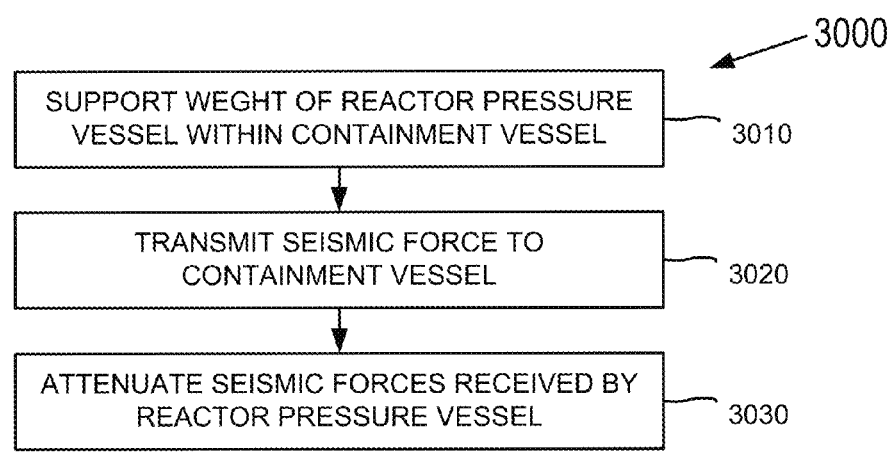
FIG. 30 illustrates an example operation of the transmission of dynamic or seismic force through a reactor module structure.

FIG. 30 illustrates an example operation 3000 for transmitting dynamic or seismic forces through a reactor module structure. The reactor module structure may comprise a containment vessel that houses a reactor pressure vessel. The reactor vessel may be spaced apart from the containment vessel by an annular containment volume. In some examples, the annular containment volume may be evacuated to provide thermal insulation between the containment vessel and the reactor pressure vessel.

At operation 3010, some or substantially all of the weight of the reactor pressure vessel within the containment vessel may be supported by a support structure. The support structure may pass through the annular containment volume.

At operation 3020, a seismic force may be transmitted to the containment vessel. The containment vessel may be supported by a base support located near a bottom head of the containment vessel. In some examples, the base support may comprise a base skirt.

At operation 3030, the seismic force that is received by the reactor pressure vessel may be attenuated by an attenuation device. In some examples, the attenuation device may not be configured to support any of the weight of the reactor pressure vessel. The attenuation device may pass through the annular containment volume. In some examples, the attenuation device may be located along a longitudinal centerline of the reactor pressure vessel and/or a longitudinal centerline of the containment vessel. The attenuation device may be configured to attenuate the seismic force in a direction transverse to the longitudinal centerline(s).

Additionally, the attenuation device may form part of a seismic force attenuation path which transfers the seismic force from the containment vessel to the reactor pressure vessel. The seismic force attenuation path may comprise a vertical portion that passes through a base support located near the bottom head of the containment vessel. The attenuation device may be configured to attenuate the seismic force in direction that is substantially transverse to the vertical portion of the seismic force attenuation path.

Figure 31:
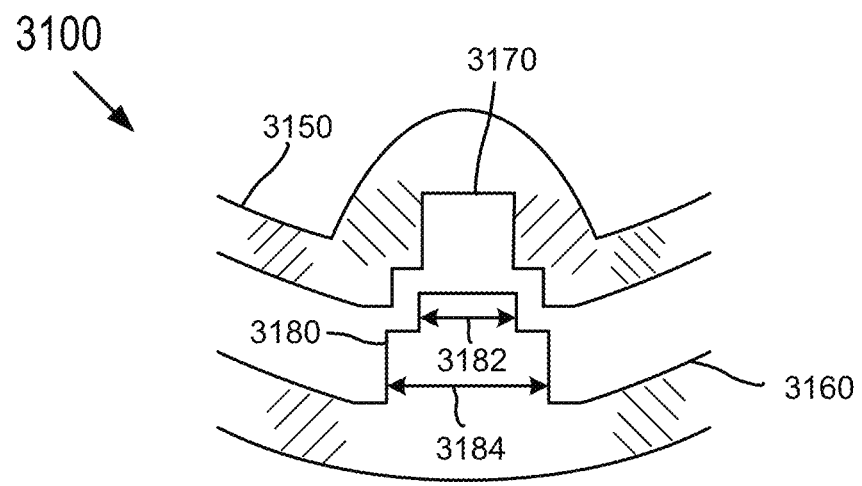
FIG. 31 illustrates an example system comprising a stair-step shaped key.

FIG. 31 illustrates an example system 3100 comprising an attenuation device configured as a stair-step shaped key 3180. Key 3180 may be configured to fit within a recess 3170 having a complimentary shaped stair-step inner surface. Key 3180 may extend upward in a substantially vertical direction from the inner surface of a CNV 3160 into the adjacent recess 3170 of an RPV 3150. The stair-step shape of key 3180 may comprise a first step 3182 having a first diameter and a second larger step 3184 having a second diameter. In some examples, FIG. 31 may be considered as illustrating a reactor module comprising RPV 3150 and/or CNV 3160 in a nominal or non-expanded state, in which a lateral clearance is provided between first step 3182 and recess 3170.

Figure 32:
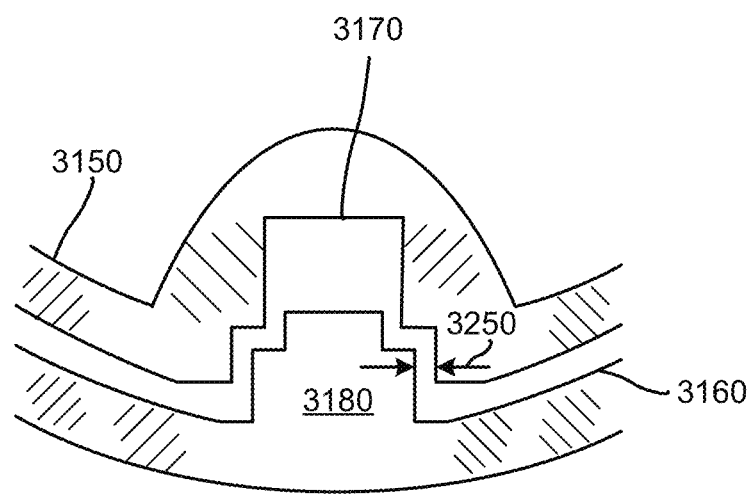
FIG. 32 illustrates the example system of FIG. 31 in an expanded state.

FIG. 32 illustrates an enlarged partial view of the example system 3100 of FIG. 31 with RPV 3150 in an enlarged or expanded state. A lateral clearance 3250 between key 3180 and recess 3170 in the expanded state may be approximately equal to the lateral clearance associated with RPV 3150 in the nominal or non-expanded state, as illustrated in FIG. 31.

Although at least some of the examples provided herein have primarily described a pressurized water reactor and/or a light water reactor, it should be apparent to one skilled in the art that the examples may be applied to other types of power systems. For example, one or more of the examples or variations thereof may also be made operable with a boiling water reactor, sodium liquid metal reactor, gas cooled reactor, pebble-bed reactor, and/or other types of reactor designs.

It should be noted that examples are not limited to any particular type of fuel employed to produce heat within or associated with a nuclear reaction. Any rates and values described herein are provided by way of example only. Other rates and values may be determined through experimentation such as by construction of full scale or scaled models of a nuclear reactor system.

Having described and illustrated various examples herein, it should be apparent that other examples may be modified in arrangement and detail. We claim all modifications and variations coming within the spirit and scope of the following claims.

The invention claimed is:

1. A system for attenuating seismic forces in a nuclear reactor assembly comprising:
   a containment vessel configured located above a support surface;
   a reactor pressure vessel mounted within the containment vessel to house a nuclear reactor core; and
   an attenuation device integrally operatively coupled to the containment vessel and located along a longitudinal centerline of the reactor pressure vessel to attenuate seismic forces transmitted from the support surface to the reactor pressure vessel via the containment vessel in a substantially transverse direction to the longitudinal centerline;
   wherein the attenuation device includes an integrated vertical key portion and an integrated lateral support portion, the integrated vertical key portion extending upwardly in a substantially vertical direction from an inner surface of the containment vessel and the integrated lateral support portion extending downwardly in a substantially vertical direction from an outer surface of the containment vessel;
   wherein the integrated vertical key portion is to engage a recess of the reactor pressure vessel to provide lateral support to the reactor pressure vessel; and
   wherein the integrated lateral support portion is to engage between at least a pair of stops extending upwardly from the support surface to receive the seismic forces transmitted from the support surface.

2. The system of claim 1, wherein the attenuation device is configured to provide for a thermal expansion of the reactor pressure vessel within the containment vessel.

3. The system of claim 2,
wherein the integrated vertical key comprises a substantially vertical protrusion; and
wherein the recess comprises a vertical clearance to account for a thermal expansion of the reactor pressure vessel along the longitudinal centerline.

4. The system of claim 3,
wherein the vertical protrusion comprises a diameter; and
wherein the vessel recess further comprises an annular-shaped clearance to account for the thermal expansion of the diameter of the vertical protrusion.

5. The system of claim 1,
further comprising a support structure located in an upper half of the containment vessel and configured to support the reactor pressure vessel within the containment vessel;
wherein the attenuation device is located in the bottom half of the containment vessel.

6. The system of claim 5,
wherein a majority of a weight of the reactor pressure vessel is supported by the support structure; and
wherein substantially none of the weight of the reactor pressure vessel is supported by the attenuation device.

7. The system of claim 1,
wherein the containment vessel comprises a cylindrical-shaped support skirt that contacts the support surface;
wherein a bottom head of the containment vessel is located some distance above the support surface; and
wherein the support skirt comprises through-holes configured to allow coolant to flow through the support skirt and contact the bottom head.

8. The system of claim 1,
wherein the integrated vertical key comprises a vertical post located along the longitudinal centerline of the containment vessel; and
wherein the vertical post is inserted into the recess of the reactor pressure vessel.

9. The system of claim 8,
wherein the containment vessel comprises a bottom head; and
wherein the vertical post extends upward from the bottom head of the containment vessel into the recess associated with the reactor pressure vessel.

10. The system of claim 9,
wherein the integrated lateral support may be configured to contact the at least the pair of stops without directly contacting the support surface.

* * * * *